US009876352B2

United States Patent
Biswas et al.

(10) Patent No.: US 9,876,352 B2
(45) Date of Patent: Jan. 23, 2018

(54) VOLTAGE STABILITY MONITORING IN POWER SYSTEMS

(71) Applicant: Washington State University, Pullman, WA (US)

(72) Inventors: Saugata Swapan Biswas, Pullman, WA (US); Anurag K Srivastava, Pullman, WA (US)

(73) Assignee: Washington State University, Pullman, WA (US)

(*) Notice: Subject to any disclaimer, the term of this patent is extended or adjusted under 35 U.S.C. 154(b) by 575 days.

(21) Appl. No.: 14/189,950

(22) Filed: Feb. 25, 2014

(65) Prior Publication Data

US 2014/0244065 A1    Aug. 28, 2014

Related U.S. Application Data

(60) Provisional application No. 61/769,528, filed on Feb. 26, 2013.

(51) Int. Cl.
| | |
|---|---|
| *G05F 1/10* | (2006.01) |
| *H02J 3/00* | (2006.01) |
| *H02J 3/06* | (2006.01) |
| *H02J 13/00* | (2006.01) |

(52) U.S. Cl.
CPC ............ *H02J 3/00* (2013.01); *H02J 3/06* (2013.01); *H02J 13/001* (2013.01); *H02J 13/0006* (2013.01); *H02J 2003/007* (2013.01); *Y02E 60/76* (2013.01); *Y04S 10/40* (2013.01); *Y04S 40/22* (2013.01)

(58) Field of Classification Search
None
See application file for complete search history.

(56) References Cited

U.S. PATENT DOCUMENTS

| | | | | |
|---|---|---|---|---|
| 5,642,000 | A * | 6/1997 | Jean-Jumeau | H02J 3/1871 307/31 |
| 6,690,175 | B2 * | 2/2004 | Pinzon | H02J 3/24 324/522 |
| 8,154,892 | B2 * | 4/2012 | Kernahan | H02J 3/383 363/65 |

(Continued)

FOREIGN PATENT DOCUMENTS

KR    20080057868 A  *  6/2008

OTHER PUBLICATIONS

Gong et al. "Synchrophasor-Based Real-Time Voltage Stability Index" Oct. 2005, 32nd Annual Wester Prtective Relay Conference.*

(Continued)

*Primary Examiner* — James D Rutten
(74) *Attorney, Agent, or Firm* — Liang IP, PLLC

(57) ABSTRACT

Systems and methods for voltage stability monitoring in power systems are disclosed herein. In one embodiment, a method includes receiving data representing a set of system parameters of a power system having one or more power buses under a load condition. The method also includes estimating one or more sets of the system parameters under one or more additional load conditions based on the received data and topology information of the power system. The method further includes determining a voltage stability index for the power system based on both the received set of system parameters and the estimated one or more sets of the system parameters.

19 Claims, 22 Drawing Sheets

(56) References Cited

U.S. PATENT DOCUMENTS

| | | | | |
|---|---|---|---|---|
| 2004/0158417 A1* | 8/2004 | Bonet | ............ | H02J 3/00 |
| | | | | 702/57 |
| 2009/0027067 A1* | 1/2009 | Li | ............ | G01R 27/16 |
| | | | | 324/650 |
| 2009/0085407 A1* | 4/2009 | Venkatasubramanian | ............ | |
| | | | | G05F 1/70 |
| | | | | 307/98 |
| 2011/0196630 A1* | 8/2011 | Dong | ............ | H02J 3/006 |
| | | | | 702/62 |
| 2012/0283967 A1* | 11/2012 | Duan | ............ | H02J 13/0006 |
| | | | | 702/60 |
| 2014/0180663 A1* | 6/2014 | Acharya | ............ | H02J 13/001 |
| | | | | 703/18 |

OTHER PUBLICATIONS

P. W. Sauer and M. A. Pai, "Power system steady-state stability and the load-flow Jacobian," in IEEE Transactions on Power Systems, vol. 5, No. 4, pp. 1374-1383, Nov. 1990, doi: 10.1109/59.99389.*
Makasa et al. "Estimation of Voltage Stability Index in a Power System with Plug-in Electric Vehicles".*

* cited by examiner

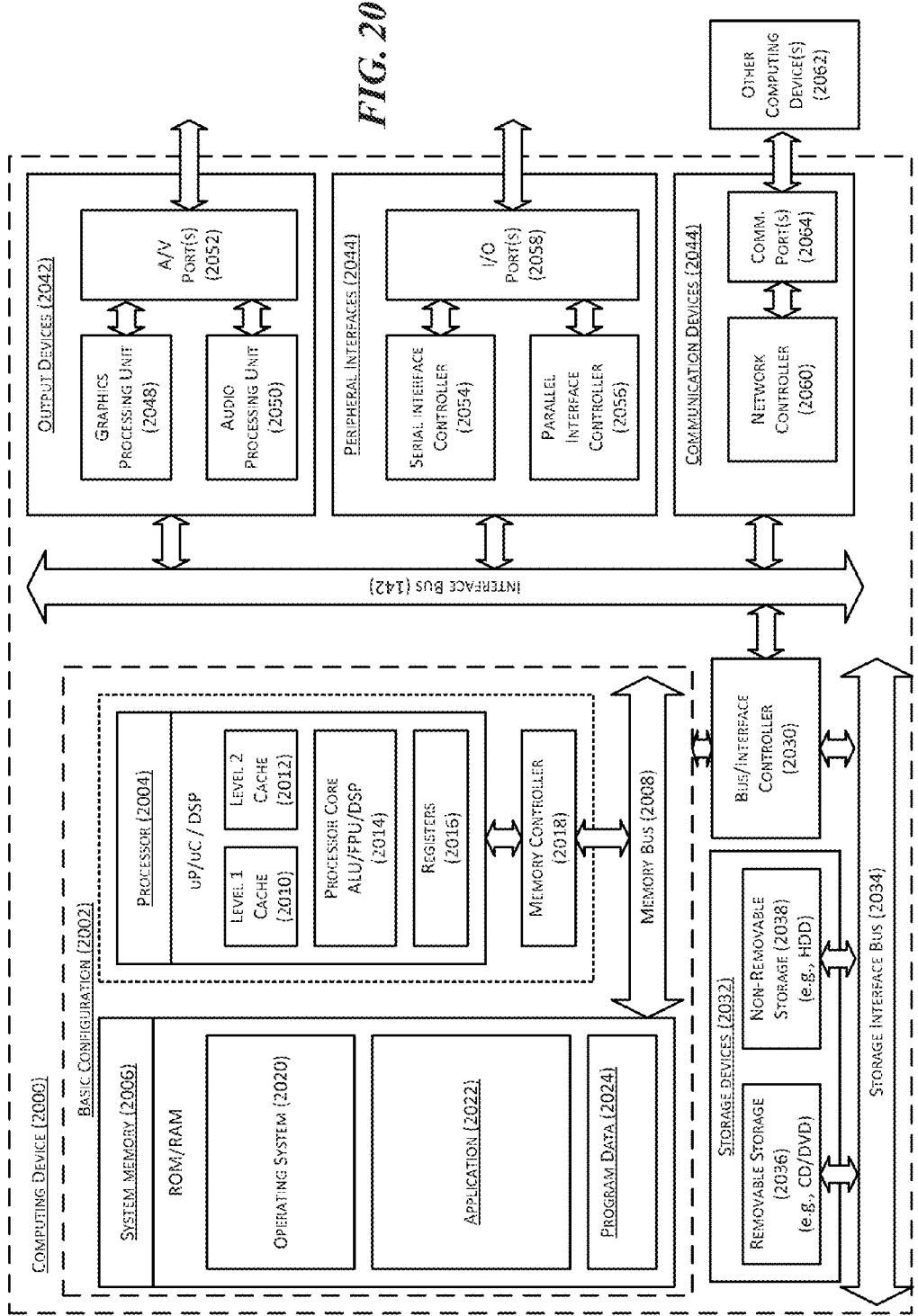

VOLTAGE STABILITY MONITORING IN POWER SYSTEMS

CROSS-REFERENCE TO RELATED APPLICATION(S)

This application claims priority to U.S. Provisional Application No. 61/769,528, entitled "Realtime VSPAP Enginer," filed Feb. 26, 2013.

BACKGROUND

Voltage stability is a major concern for power transmission in electrical power systems. Voltage stability is the ability of a power system to remain in a state of equilibrium under normal operating conditions and to regain an acceptable state of equilibrium after a load change, a generation capacity change, or other disturbances. The lack of voltage stability is believed to be a result of the power system attempting to restore power consumption beyond the capacity of the combined transmission and generation facilities. If not promptly corrected, the lack of voltage stability may lead to unacceptably low voltages (commonly referred to as a voltage collapse) in at least a part of the power system. A Voltage collapse can cause electrical equipment failures, blackouts, and other electrical system incidents.

BRIEF DESCRIPTION OF THE DRAWINGS

FIG. 20 is a computing device suitable for certain components of the power system in FIG. 1.

DETAILED DESCRIPTION

Figure 1:
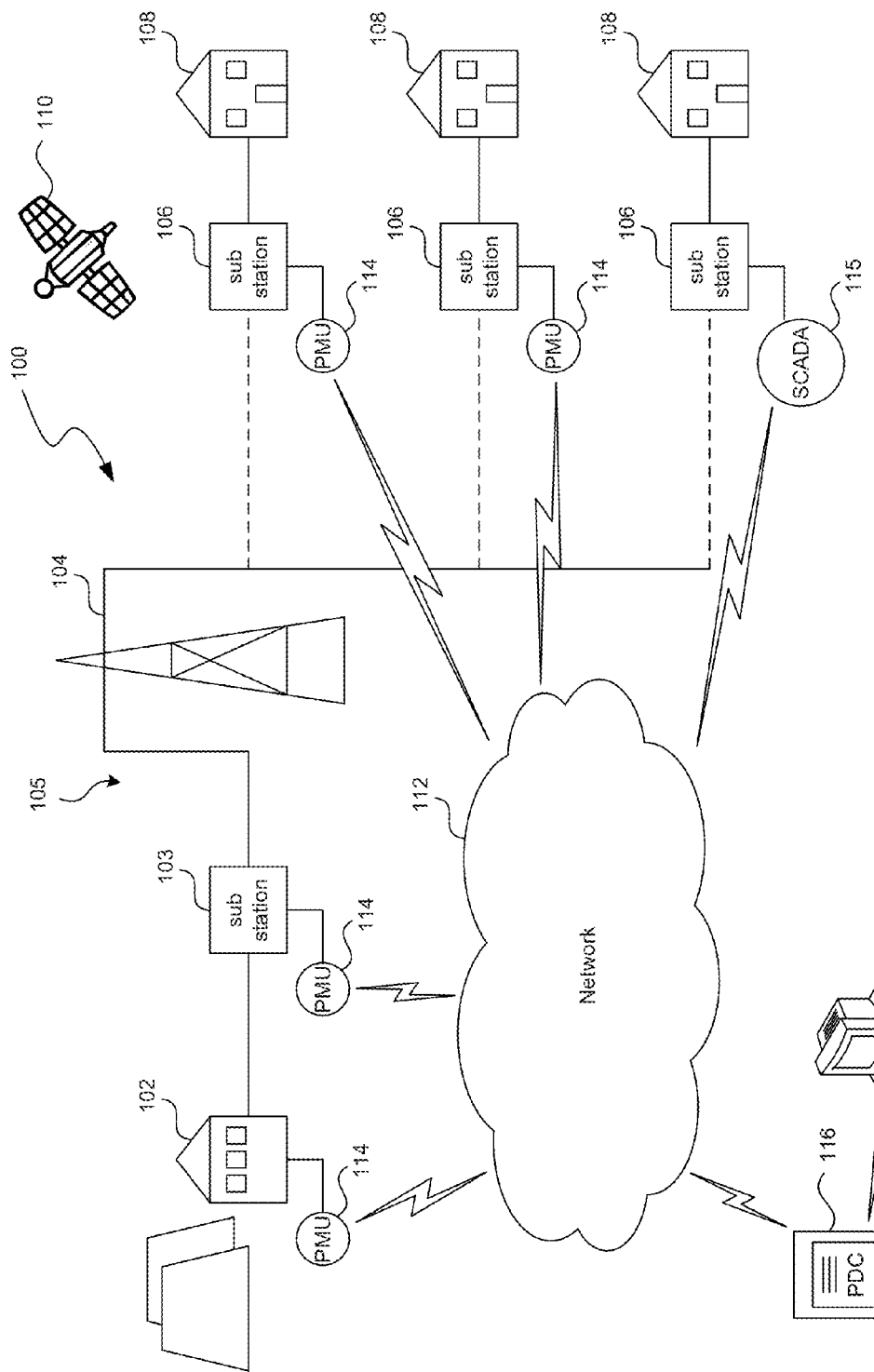
FIG. 1 is a schematic diagram of a power system with voltage stability monitoring in accordance with embodiments of the present technology.

Specific details of several embodiments of the technology are described below with reference to systems and methods for monitoring and/or predicting voltage stability in power systems. Several embodiments can have configurations, components, or procedures different than those described in this section, and other embodiments may eliminate particular components or procedures. A person of ordinary skill in the relevant art, therefore, would understand that the technology may have other embodiments with additional elements, and/or may have other embodiments without several of the features shown and described below with reference to FIGS. 1-20.

As discussed above, voltage stability is a major concern in power systems. Thevenin's equivalent network reduction is one approach to derive an index (or other indicators) for indicating and/or measuring voltage stability in a power system. According to this approach, system parameters (e.g., voltage, power, phase, etc.) of different nodes in the power system can be collected over a window of time. Thevenin's equivalent network parameters of the power system (e.g., as voltage, impedance, etc. of a 2-bus circuit) can then be derived based on the collected system parameters. The derived Thevenin's equivalent network parameters can then be used to calculate the voltage stability index of the power system.

The foregoing approach to derive voltage stability indices, however, suffers from a few drawbacks. First, the foregoing approach requires collecting data over a window (or a period) of time. If the power system fluctuates significantly during the window of time, the system parameters collected may not accurately reflect the "true" conditions/status of the power system. Thus, the derived voltage stability indices may be inaccurate. Also, the foregoing approach requires multiple sets of the collected system parameters in order to perform the Thevenin's equivalent network reduction of the power system. As a result, the calculation can often be iterative and may not truly provide "real-time" results.

Several embodiments of the present technology generally relate to systems and methods for deriving voltage stability indices in a non-iterative manner based on both (1) at least one set of system parameters collected at one instance (referred to herein as "actual system parameters"); and (2) topology information of a power system. The actual system parameters can include one or more of a voltage, voltage angle, current, current angle, bus connectivity status (e.g., as represented by a bus admittance matrix), predicted real power load, predicted reactive power load, predicted bus connective status, and/or other suitable types of data from phasor measurement units ("PMUs" or synchrophasors), supervisory control and data acquisition ("SCADA") facilities, and/or other suitable sensors of the power system. The topology information can include inter-node connectivity data, intra-node connectivity data, and/or other suitable data.

In accordance with certain aspects of the present technology, one or more sets of estimated system parameters (referred to herein as "pseudo system parameters") can be derived based on the topology information of the power system in response to a load or power perturbation from the collected system parameters. The load perturbation can be a random, predetermined, user selected, predicted, expected, or otherwise determined percentage (or value) of a load in the power system. In one example, the load perturbation can be from about 0.01% to about 0.1% of a current load value of buses in the power system. In other examples, the load perturbation can have other suitable values based on a tolerance, a linearity, and/or other suitable properties of the power system. The derived pseudo system parameters can then be used to derive a voltage stability index in conjunction with the actual system parameters. As a result, accuracy and derivation speed of the voltage stability index can be improved over conventional techniques. Several embodiments of the foregoing technology have been tested on certain power systems as described in more detail below.

FIG. 1 is a schematic diagram of a power system 100 in accordance with embodiments of the technology. As shown in FIG. 1, the power system 100 can include a power generating plant 102, a step-up substation 103, a transmission tower 104, a plurality of step-down substations 106, and a plurality of power consuming loads 108 interconnected with one another by a power grid 105. Even though only certain system components (e.g., one power generating plant 102 and one step-up substation 103) are illustrated in FIG. 1, in other embodiments, the power system 100 and/or the power grid 105 can include other system components in addition to or in lieu of those components shown in FIG. 1.

The power system 100 can also include a plurality of PMUs 114 and/or SCADA devices 115 individually coupled to various system components of the power system 100. For example, as illustrated in FIG. 1, the power generating plant 102, the step-up substation 103, and two of the step-down substations 106 include PMUs 114. The other step-down substation 106 includes a SCADA device 115. The SCADA device 115 can be configured to configured to measure voltage, current, power, and/or other suitable parameters. The PMUs 114 can be configured to measure voltage, current, voltage phase, current phase, and/or other types of phasor data in the power system 100 based on a common time reference (e.g., a GPS satellite 110).

The power system 100 can also include a phasor data concentrator ("PDC") 116 operatively coupled to the PMUs 114 via a network 112 (e.g., an internet, an intranet, a wide area network, and/or other suitable types of network). The PDC 116 can be configured to receive and process data from the PMUs 114 and the SCADA device 115 to generate actual system parameters. For example, in certain embodiments, the PDC 116 can include a logic processing device (e.g., a network server, a personal computer, etc.) located in a control center and configured to receive and "align" phasor measurements from the PMUs 114 based on corresponding time stamps with reference to the GPS satellite 110. In other embodiments, the PDC 116 can also be configured to receive and compile data received from the SCADA device 115. The PDC 116 can then store and/or provide the actual system parameters for further processing by other components of the power system 100.

In the illustrated embodiment, the power system 100 includes a supervisory computing station 118 operatively coupled to the PDC 116. The supervisory computing station 118 can include a network server, a desktop computer, and/or other suitable computing devices. One example computing device suitable for the supervisory computing station 118 is described in more detail below with reference to FIG. 20. The supervisory computing station 118 is configured to retrieve data related to the system parameters from the PDC 116 and analyze the retrieved data in order to monitor voltage stability in the power system 100. Example software modules suitable for the supervisory computing station 118 are described below with reference to FIG. 2. In other embodiments, the supervisory computing station 118 may be omitted, and the PDC 116 and/or other suitable computing devices (not shown) may perform at least some of the operations described below.

In operation, the PDC 116 receives measurement data from the PMUs 114 and the SCADA device 115 individually associated with various components of the power system 100. The PDC 116 can then compile and/or otherwise process the received measurement data to generate data related of the actual system parameters. For example, in one embodiment, the PDC 116 can "align" phasor measurements from the PMUs 114 based on corresponding time stamps with reference to the GPS satellite 110. In other embodiments, the PDC 116 can also sort, filter, average, and/or perform other operations on the received data.

The PDC 116 can then provide at least one set of the generated actual system parameters at one instance to the supervisory computing station 118 for analysis of voltage stability. The supervisory computing station 118 then derive one or more voltage stability indices in a non-iterative manner based on both (1) the at least one set of actual system parameters received from the PDC 116; and (2) topology information of the power system 100. The supervisory computing station 118 can then raise an alarm, outputting a warning signal, and/or perform other suitable actions based on the derived voltage stability indices. In certain embodiments, the supervisory computing station 118 can also predict or estimate one or more voltage stability indices based on expected and/or historical load conditions in the power system 100. Example operations for deriving or predicting the one or more voltage stability indices are described below with reference to FIGS. 3A-3C.

Several embodiments of the present technology can more accurately determine or estimate the voltage stability indices because the present technology does not require data collected over a window of time. Rather, only one set of actual system parameters may be needed to derive a voltage stability index. Thus, fluctuation in conditions of the power system 100 would not significantly impact the derived voltage stability index. Also, the present technology utilizes calculations in a non-iterative manner without needing multiple sets of the actual system parameters. Thus, the present technology can more efficiently derive the voltage stability indices.

Figure 2:
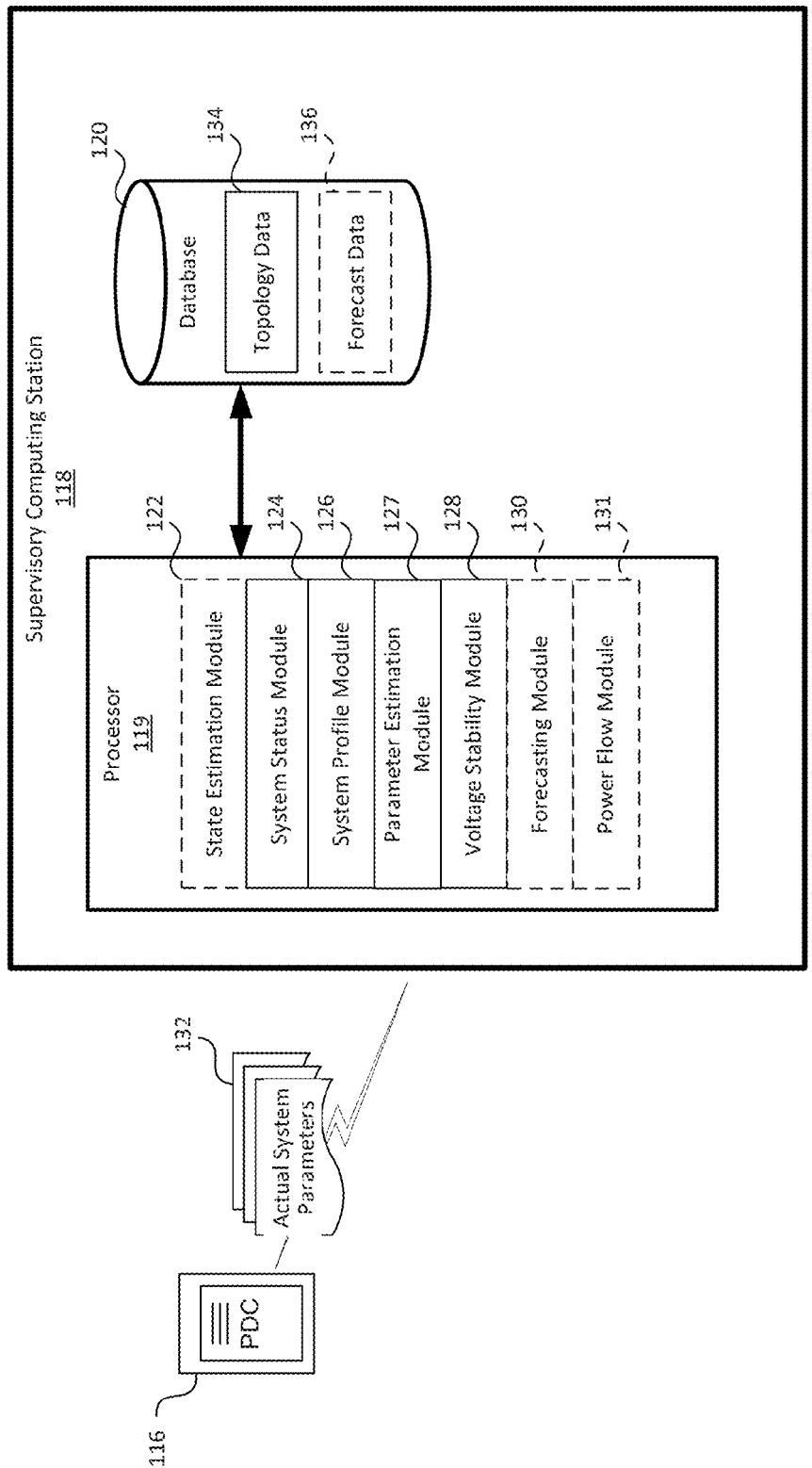
FIG. 2 is a block diagram showing software modules of the supervisory computing station of FIG. 1 in accordance with embodiments of the present technology.

FIG. 2 is a block diagram showing software modules of the supervisory computing station 118 of FIG. 1 in accordance with embodiments of the present technology. In FIG. 2 and in other Figures herein, individual software modules, components, and routines may be a computer program, procedure, or process written as source code in C, C#, C++, Java, and/or other suitable programming languages. The computer programs, procedures, or processes may be compiled into intermediate, object or machine code and presented for execution by a processor of a personal computer, a network server, a laptop computer, a smart phone, a tablet, and/or other suitable computing devices. Various implementations of the source, intermediate, and/or object code and associated data may be stored in one or more computer readable storage media that include read-only memory, random-access memory, magnetic disk storage media, optical storage media, flash memory devices, and/or other suitable media. As used herein, the term "computer readable storage medium" excludes propagated signals, per se.

As shown in FIG. 2, the supervisory computing station 118 can include a processor 119 operatively coupled to a database 120. The processor 119 can include an optional state estimation module 122, a system status module 124, a system profile module 126, a parameter estimation module 127, and a voltage stability module 128. The database 120 can contain records of topology data 134. Examples of the topology data 134 can include bus connectivity data, load connectivity data, and/or other suitable inter-node connectivity data of the power system 100. In one embodiment, at least some of the topology data 134 (e.g., load connection configuration) can be input by an operator. In another embodiment, at least some of the topology data 134 (e.g., bus connectivity data) can be updated periodically by, for example, monitoring electrical switch positions in the power system 100.

In certain embodiments, the optional state estimation module 122 can be configured to perform state estimation based on the actual system parameters 132 received from the PDC 116. As used herein, a state as being related to the power system 100 (FIG. 1) generally refers to a complex voltage with a voltage magnitude and a phase angle at each bus in the power system 100, as follows:

$$\tilde{V}_i = V_i e^{j\delta_i}$$

where $\tilde{V}_i$ is a complex voltage for bus i; $V_i$ is a voltage magnitude for bus i; and $\delta_i$ is an phase angle at bus i. A state estimation generally refers to estimate and/or infer the state based on available measurements of system parameters. For example, in one embodiment, the state estimation module 122 may be configured to perform a linear state estimation based on phasor measurements from the PMUs 114 (FIG. 1). In another embodiment, the state estimation module 122 may be configured to perform a hybrid state estimation based on data collected from both the PMUs 114 and the SCADA device 115 (FIG. 1). In yet another embodiment, the state estimation module 122 may be configured to perform a state estimation based on data collected from the SCADA device 115 alone, for example, by calculating the phase angle based on collected real and reactive power from SCADA device 115. In other embodiments, the state estimation module 122 may be configured to perform state estimation based on other suitable information and/or in other suitable manners. In further embodiments, the state estimation module 122 may be omitted, and the PDC 116 may perform the state estimation.

The system status module 124 can be configured to calculate at least one status parameters based on system parameters. In certain embodiments, example system parameters can include:

Voltage magnitude at all buses in the power system 100; and

Voltage angle at all buses in the power system 100.

In other embodiments, the system parameters can include other suitable parameters. Example status parameters can include a current magnitude, a current angle, a real power injection, a reactive power injection and/or other suitable status parameters for all buses in the power system 100. In one embodiment, the system parameters include the actual system parameters 132 from the PDC 116. In other embodiments, the system parameters can include pseudo system parameters based on predicted power load information, as described in more detail below. In further embodiments, the system parameters can include other suitable parameters. The system status module 124 can be configured to perform the power flow analysis based on a combination of voltage magnitude and voltage angle at all buses in the power system 100, a combination of current magnitude and current angle at all buses in the power system 100, a combination of all of the foregoing system parameters, and/or additional suitable parameters.

The system profile module 126 can be configured to generate a mathematical representation of system profile of the power system 100 based on the topology data 134 and the actual system parameters 132. In the following description, a linearized Jacobian Matrix is used as an example mathematical representation. In other embodiments, the system profile may be represented as a function, a polynomial, and/or in other suitable manners.

In one embodiment, the system profile module 126 can be configured to generate a Jacobian matrix as follows:

$$\text{Jacobian Matrix} = \begin{bmatrix} \left[\frac{\partial P}{\partial \delta}\right] & \left[\frac{\partial P}{\partial |V|}\right] \\ \left[\frac{\partial Q}{\partial \delta}\right] & \left[\frac{\partial Q}{\partial |V|}\right] \end{bmatrix}_{[(2\times Total\ No.\ of\ buses)-(No.\ of\ generator\ buses)-2]\times [(2\times Total\ No.\ of\ buses)-(No.\ of\ generator\ buses)-2]}$$

$$Pi = \sum_{j=1}^{n} |Vi|*|Vj|*|Yij|*\cos(\delta i - \delta j - \theta ij), \text{ where } i \in \text{each bus \& } j \in \text{every other bus}$$

$$Qi = \sum_{j=1}^{n} |Vi|*|Vj|*|Yij|*\sin(\delta i - \delta j - \theta ij), \text{ where } i \in \text{each bus \& } j \in \text{every other bus}$$

where Pi is a real power of bus i; Qi is reactive power of bus i; σi is a phase angle of bus I; Vi is a voltage of bus i; Vj is a voltage of bus j; Yij is a voltage relation between buses i and j; and θij is a phase angle relation between buses i and j. In one embodiment, elements of the Jacobian Matrix may be calculated using Taylor's series linearization technique based on the system parameters, the topology data 134, and/or the derived parameters from the power flow module 124. In other embodiments, the elements of the Jacobian Matrix may be calculated using other suitable techniques.

The parameter estimation module 127 can be configured to estimate system parameters (i.e., pseudo system parameters) based on the actual system parameters from the optional state estimation module 122 and the mathematical representation of system profile of the power system 100 from the system profile module 126. The parameter estimation module 127 can select or otherwise determine one or more power perturbations (e.g., a Delta having a real power perturbation ΔPL and a corresponding reactive power perturbation ΔQL) corresponding to one or more system conditions of the power system 100 based on the actual system parameters 132 as follows:

$$\text{Delta} = \begin{bmatrix} [\Delta PL] \\ [\Delta QL] \end{bmatrix}_{[(2\times Total\ No.\ of\ buses)-(No.\ of\ generator\ buses)-2]}$$

In one embodiment, the selected power perturbation may be a predetermined real power perturbation (ΔPL), e.g., between about 0.01% to about 0.1% of a current load value of buses in the power system 100. In another embodiment, the selected power perturbation may be a random real power perturbation (ΔPL) in the foregoing range. The corresponding reactive power perturbation (ΔQL) can then be calculated by maintaining the same ratio between the real and reactive power. In further embodiments, the power perturbation may be a reactive power perturbation, a combination of real and reactive power perturbations, or other types of power perturbations selected in other similar or different manners.

The parameter estimation module 127 can then be configured to derive one or more sets of additional system characteristics (e.g., voltage and/or current phasors for all buses) based on the selected power perturbation. The one or more sets of additional system characteristics are referred to as the pseudo system parameters because such data are derived not based on actual measurements but instead based on estimated or expected system conditions in the power system 100. For example, in one embodiment, a set of pseudo voltage phasors can be derived based on a negative value of the selected power perturbation as follows:

$$\begin{bmatrix} [\Delta VL1] \\ [\Delta \delta L1] \end{bmatrix} = \begin{bmatrix} \left[\frac{\partial P}{\partial \delta}\right] & \left[\frac{\partial P}{\partial |V|}\right] \\ \left[\frac{\partial Q}{\partial \delta}\right] & \left[\frac{\partial Q}{\partial |V|}\right] \end{bmatrix} \times \begin{bmatrix} [-\Delta PL] \\ [-\Delta QL] \end{bmatrix}$$

$$[VL1] = [VL] + [\Delta VL1]$$

In another embodiment, a set of pseudo current phasors can be derived based on a negative value of the selected power perturbation as follows:

$$\begin{bmatrix} [\Delta IL1] \\ [\Delta \beta L1] \end{bmatrix} = [Y\_Bus] \times \begin{bmatrix} [\Delta VL1] \\ [\Delta \delta L1] \end{bmatrix}$$

$$[IL1] = [IL] + [\Delta IL1]$$

where Y_bus is a bus admittance matrix. In yet another embodiment, a set of pseudo voltage phasors can be derived based on a positive value of the selected power perturbation as follows:

$$\begin{bmatrix} [\Delta VL2] \\ [\Delta \delta L2] \end{bmatrix} = \begin{bmatrix} \left[\frac{\partial P}{\partial \delta}\right] & \left[\frac{\partial P}{\partial |V|}\right] \\ \left[\frac{\partial Q}{\partial \delta}\right] & \left[\frac{\partial Q}{\partial |V|}\right] \end{bmatrix} \times \begin{bmatrix} [+\Delta PL] \\ [+\Delta QL] \end{bmatrix}$$

$$[VL2] = [VL] + [\Delta VL2]$$

In another embodiment, a set of pseudo current phasors can be derived based on a positive value of the selected power perturbation as follows:

$$\begin{bmatrix} [\Delta IL2] \\ [\Delta \beta L2] \end{bmatrix} = [Y\_Bus] \times \begin{bmatrix} [\Delta VL2] \\ [\Delta \delta L2] \end{bmatrix}$$

$$[IL2] = [IL] + [\Delta IL2]$$

The parameter estimation module 127 can then estimate a Thevenin's equivalent impedance (Zth) for each bus based on the actual system parameters and the derived pseudo system parameters. For example, in one embodiment, a Thevenin's equivalent impedance can be estimated based on the actual system parameters and the negative perturbation pseudo system parameters as follows:

$$\overline{Zth1}_i = \frac{\overline{VL}_i - \overline{VL1}_i}{\overline{IL1}_i - \overline{IL}_i} \text{ for } i \in \text{All Load Buses} \neq \text{Zero Injection Buses}$$

In another example, a Thevenin's equivalent impedance can be estimated based on the actual system parameters and the positive perturbation pseudo system parameters as follows:

$$\overline{Zth2}_i = \frac{\overline{VL2}_i - \overline{VL}_i}{\overline{IL}_i - \overline{IL2}_i} \text{ for } i \in \text{All Load Buses} \neq \text{Zero Injection Buses}$$

Then, the voltage stability module 128 can be configured to estimate the Thevenin's equivalent impedance as seen by each load bus in the power system 100 as follows:

$$\overline{Zth}_i = \frac{\overline{Zth1}_i + \overline{Zth2}_i}{2} \text{ for } i \in \text{All Load Buses} \neq \text{Zero Injection Buses}$$

Based on the foregoing information, the voltage stability module 128 can be configured to calculate a voltage stability index as follows:

$$VSI_i = \frac{|\overline{Zth}|_i}{|\overline{ZL}|_i} \text{ for } i \in \text{All Load Buses} \neq \text{Zero Injection Buses}$$

As shown in FIG. 2, the processor 119 can optionally include a forecasting module 130 and a power flow module 131. The forecasting module 130 can be configured to forecast, predict, or estimate a voltage stability index based on optional forecast data 136. The optional forecast data 136 can include, for example, forecasted real power load, forecasted reactive power load, forecasted bus admittance matrix, and/or other suitable information of the power system 100 based on historical data, mathematical modeling, and/or other suitable data. In the illustrated embodiment, the forecast data 136 is stored in the database 120. In another embodiment, at least some of the forecast data 136 may be provided by a short-term load forecasting module (not shown) executing on the processor 119 or other suitable processing devices (not shown). In further embodiments, the forecast data 136 may be input by an operator, an application, and/or other suitable data sources.

Based on the forecast data 136, the power flow module 130 can be configured to calculate a set of values (referred to herein as "predicted system parameters") of voltage magnitude, voltage angle, or other suitable parameters for all buses in the power system 100. The power flow module 131 can adopt the Newton-Raphson solution method, the Gauss-Seidel solution method, the Fast decoupled load flow solution method, and/or other suitable solution methods. The forecast module 130 can then be configured to supply the predicted system parameters to the system status module 124, the system profile module 126, the parameter estimation module 127, and the voltage stability module 128 to derive a predicted voltage stability index following generally similar operations as described above.

Figure 3A:
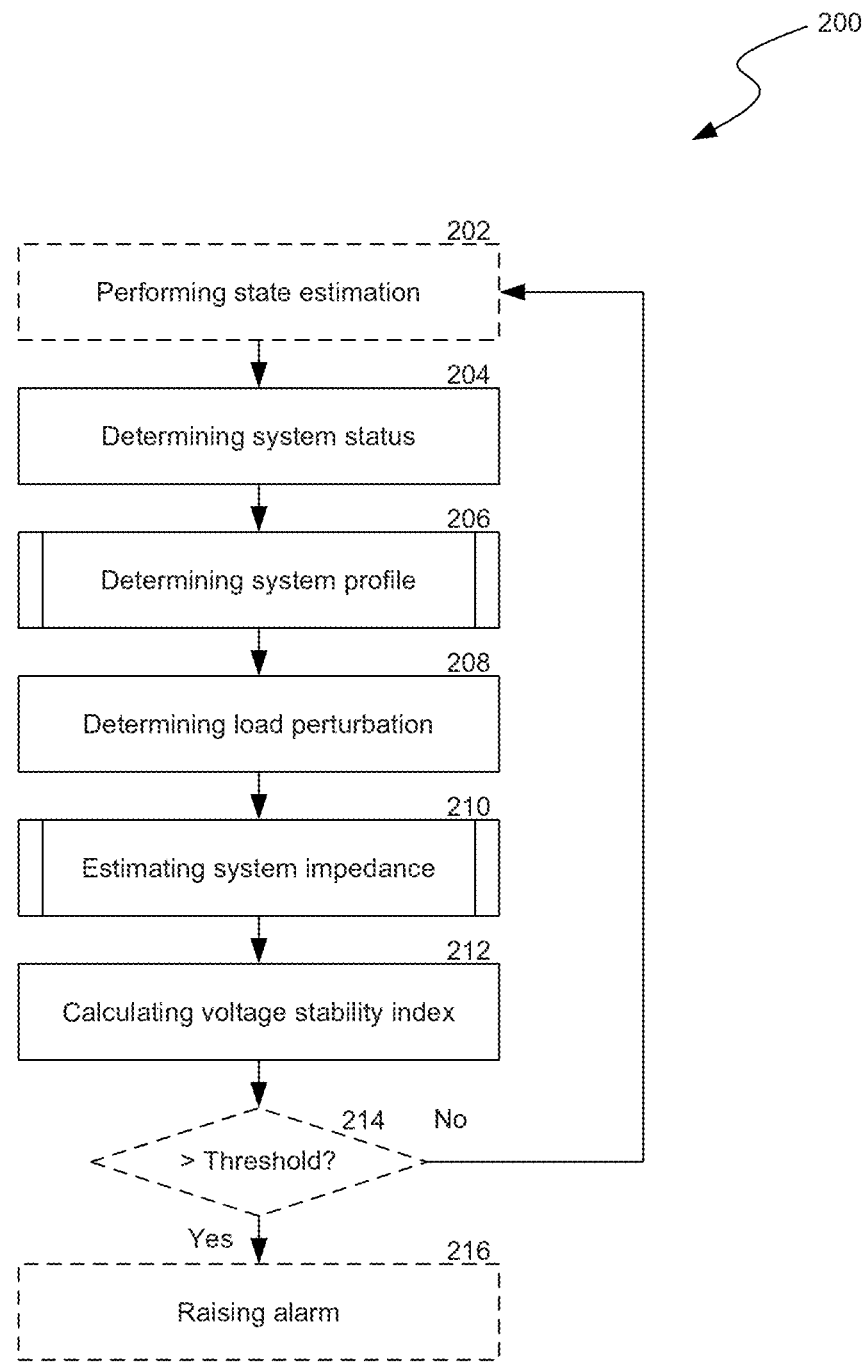
FIG. 3A is a flowchart illustrating a method for calculating a voltage stability index in accordance with embodiments of the technology.

FIG. 3A is a flowchart illustrating a method 200 for calculating a voltage stability index in accordance with embodiments of the technology. The method 200 is described below with reference to the power system 100 in FIG. 1 for illustration purposes. In other embodiments, the method 200 may also be implemented in other power systems with additional and/or different components.

As shown in FIG. 3A, the method 200 can include a stage 202 in which state estimation is performed, for example, using the state estimation module 122 (FIG. 2), based on actual system parameters and topology data of the power system 100, as described above with reference to FIG. 2. As a result, values of voltage magnitude, voltage angle, and/or other suitable parameters for all buses in a power system are obtained. The method 200 can also include another stage 204 in which status parameters of the power system 100 are determined based on the results of the state estimation from stage 202, data related to bus connectivity status (e.g., a bus admittance matrix), and/or other suitable information. In one embodiment, the status parameters include a current magnitude, a current angle, a real power injection, and a reactive power injection for all buses in the power system 100. In other embodiments, the status parameters can include other suitable system characteristics of the power system 100.

The method 200 can then include determining a system profile of the power system 100 at stage 206. In one embodiment, determining the system profile includes calculating a linearized Jacobian matrix, for example, using the system profile module 126 (FIG. 2), based on the determined status parameters from stage 206, as described above with reference to FIG. 2. Example operations of calculating the linearized Jacobian matrix are described in more detail below with reference to FIG. 3B. In other embodiments, the system profile may include other suitable representations derived in other suitable manners.

The method 200 then includes estimating one or more additional sets of pseudo system parameters (e.g., voltage and/or current phasors at all busses) based on one or more power perturbations (e.g., a load change) at stage 208, for example, using the parameter estimation module 127 (FIG. 2), as described above with reference to FIG. 2. Based on the derived pseudo system parameters, the method 200 further includes estimating Thevenin's equivalent impedance for all load buses in the power system 100 based on the actual system parameters and the derived pseudo system parameters. The method further includes calculating a voltage stability index based on the estimated Thevenin's equivalent impedance values at stage 212, as described above with reference to FIG. 2.

Optionally, the method 200 can include a decision stage 214 to determine if the calculated voltage stability index from stage 212 is above a threshold. The threshold may be set by an operator, calculated based on historical values, and/or otherwise determined. If the calculated voltage stability index from stage 212 is above the threshold, the method 200 can optionally include raising an alarm at stage 216. If the calculated voltage stability index from stage 212 is not above the threshold, the method 200 can include reverting to performing state estimation stage 202.

Figure 3B:
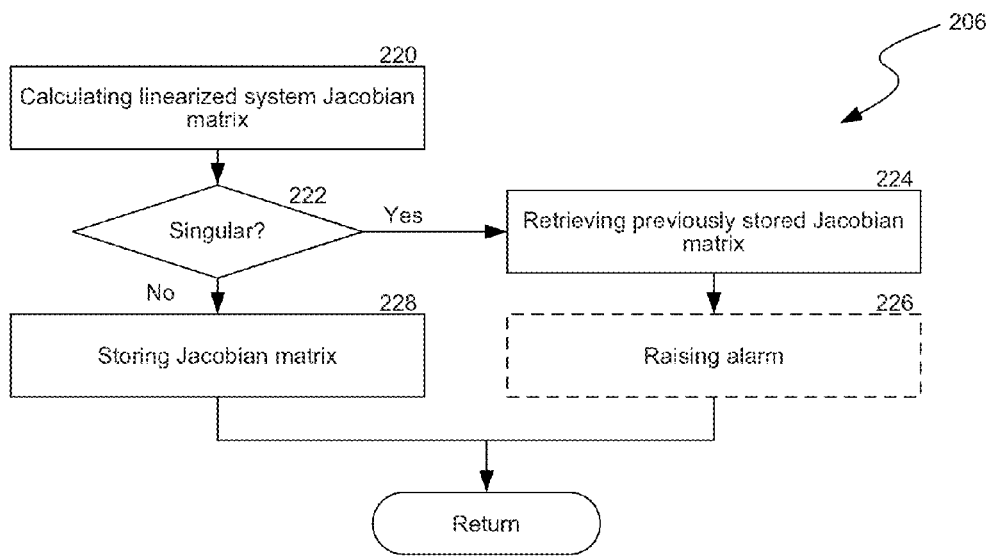
FIG. 3B is a flowchart illustrating a method for determining power system characteristics in accordance with embodiments of the technology.

FIG. 3B is a flowchart illustrating a method 206 for determining power system characteristics in accordance with embodiments of the technology. As shown in FIG. 3B, the method 206 includes calculating a linearized system Jacobian matrix at stage 220. One example technique for calculating the linearized system Jacobian matrix is described above with reference to FIG. 2. The method 206 then includes a decision stage 222 to determine whether the calculated Jacobian matrix is singular. If the Jacobian matrix is determined to be not singular, the method 206 includes setting the calculated Jacobian matrix as a current copy of the Jacobian matrix and storing the calculated Jacobian matrix. If the Jacobian matrix is determined to be singular, the method 206 includes retrieving a previously stored copy of the Jacobian matrix and setting the retrieved copy as a current copy of the Jacobian matrix at stage 224.

The method 206 can also optionally include raising an alarm for voltage collapse in response to determining that the calculated Jacobian matrix is singular. Without being bound by theory, it is believed that the Jacobian matrix may become singular when the power system 100 is very close to a voltage collapse. Thus, an operator may perform control actions to prevent an expected voltage collapse in response to the raised alarm.

Figure 3C:
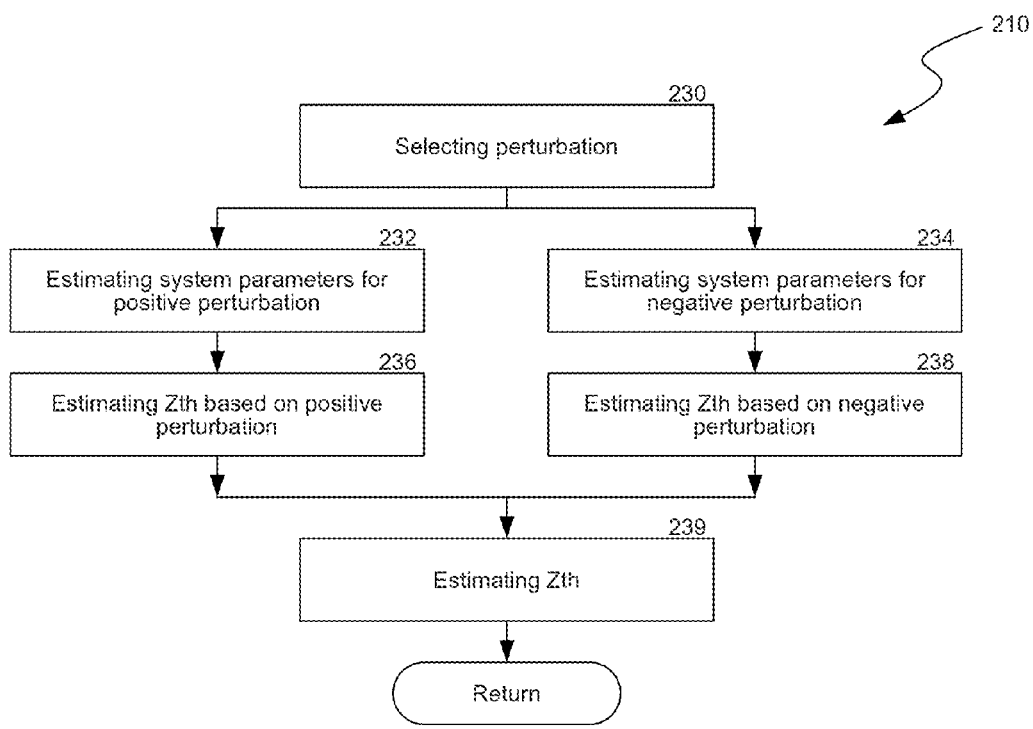
FIG. 3C is a flowchart illustrating a method for estimating system impedance based on perturbations in accordance with embodiments of the technology.

FIG. 3C is a flowchart illustrating an example method 210 for estimating system impedance based on load perturbations in accordance with embodiments of the technology. As shown in FIG. 3C, the method 208 can include selecting a load perturbation at stage 230. In one embodiment, the load perturbation can be a predetermined value between about 0.01% to about 0.1% of a current load value of the power system. In other embodiments, the load perturbation can be a random load value or percentage within a select range and/or other suitable values.

As shown in FIG. 3C, the method 210 can then include estimating system parameters, for example, using the parameter estimation module 127 (FIG. 2), based on the determined system profile from stage 206 (FIG. 3A) for a positive and negative value of the select load perturbation at stages 232 and 234, respectively. In one embodiment, the estimated system parameters can include a voltage magnitude and a voltage angle of all buses in the power system. In other embodiments, the estimated system parameters can include a current magnitude, a current angle, and/or other suitable parameters.

The method 210 can then include estimating a Thevenin's equivalent impedance (Zth) for all buses of the power system based on the estimated system parameters corresponding to the positive and negative perturbations at stages 236 and 238, respectively. The Thevenin's equivalent impedances may be estimated as described above with reference to FIG. 2, or using other suitable techniques. The method 210 can then include estimating a final Thevenin's equivalent impedance (Zth) for all buses in the power system based on both the foregoing estimated Thevenin's equivalent impedances at stage 239. In one embodiment, the final Thevenin's equivalent impedance is estimated by averaging the estimated Thevenin's equivalent impedances corresponding to the positive and negative perturbations. In other embodiments, the final Thevenin's equivalent impedance may be derived using a weighted average or other suitable techniques.

Figure 3D:
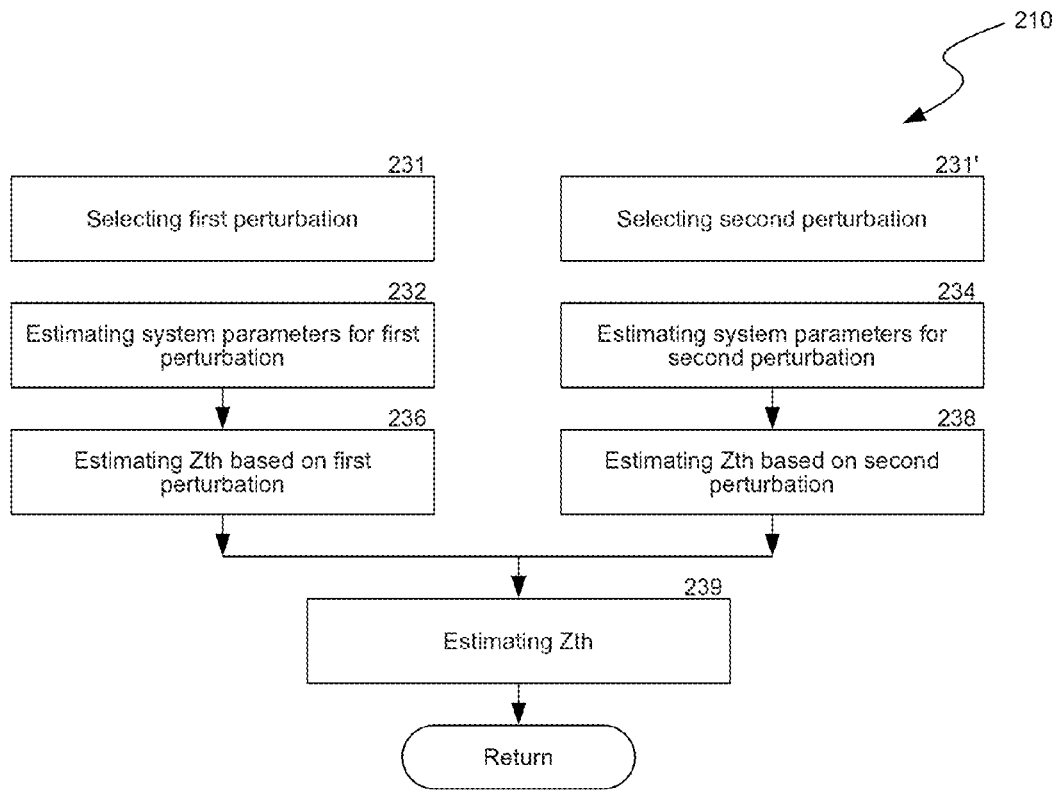
FIG. 3D is a flowchart illustrating another method for estimating system impedance based on perturbations in accordance with embodiments of the technology.

Even though certain operations of the method 210 are shown in FIG. 3C as being parallel to one another (e.g., stages 232 and 234), in other embodiments, the operations may be performed in a sequential, interleave, or other suitable fashion. Also, even though positive and negative values of the selected perturbation are used to illustrate the technique in FIG. 3C, in other embodiments, the one or more perturbations may be selected separately, in groups, or in other suitable manners. For example, as shown in FIG. 3D, a first perturbation and a second perturbation may be selected separately at stages 231 and 231', respectively. As a result, the first and second perturbations may have the same or different absolute values from each other.

Figure 3E:
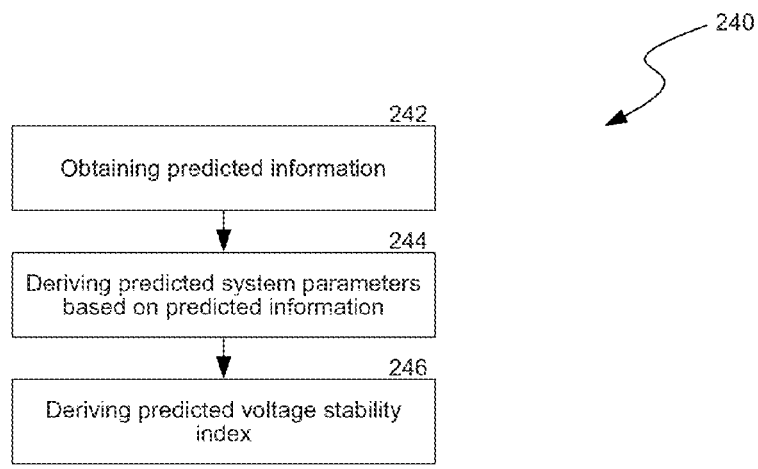
FIG. 3E is a flowchart illustrating a method for calculating a predicted voltage stability index in accordance with embodiments of the technology.

FIG. 3E is a flowchart illustrating a method 240 for calculating a predicted voltage stability index in accordance with embodiments of the technology. As shown in FIG. 3E, the method 240 can include obtaining predicted information at stage 242. In certain embodiments, the predicted information can include forecasted real power load, forecasted reactive power load, and forecasted bus connectivity status (e.g., as represented by a bus admittance matrix). In other embodiments, the predicted information may include other suitable information. In one embodiment, the predicted information may be provided by a short term forecasting engine. In other embodiments, the predicted information may be provided by an operator, an application, and/or other suitable sources.

The method 240 can the include deriving predicted system parameters based on the predicted information at stage 244. In one embodiment, deriving the predicted system parameters can include initially setting a voltage magnitude to 1 pu and a phase angle to 0 for all buses in the power system. Subsequently, a power flow analysis can be performed on the power system based on the predicted information to calculate the predicted system parameters. In other embodiments, the predicted system parameters may be derived using other suitable techniques. The method 240 can then include deriving a predicted voltage stability index at stage 246, for example, by performing operations generally similar to operations at stages 204, 206, 208, 210, and 212 of the method 200 in FIG. 3A.

Experiments

Several experiments were conducted to study the accuracy of several embodiments of the present technology. A computing device was configured generally similarly to the supervisory computing station 118 in FIG. 1. The computing device was then used to study voltage stability in example power systems, as discussed in more detail below. The results of the experiments show that embodiments of the present technology can be used to efficiently monitor deterioration of voltage stability in power systems due to a load increase, a load decrease, and a contingency. The following parameters are shown graphically in FIGS. 4-19:

Voltage Magnitude of all buses;
Voltage Angle of all buses;
Real Power Loading of all load buses (excluding zero-injection buses); and
Voltage Stability Index (VSAI) of all load buses (excluding the zero-injection buses).

Figure 4:
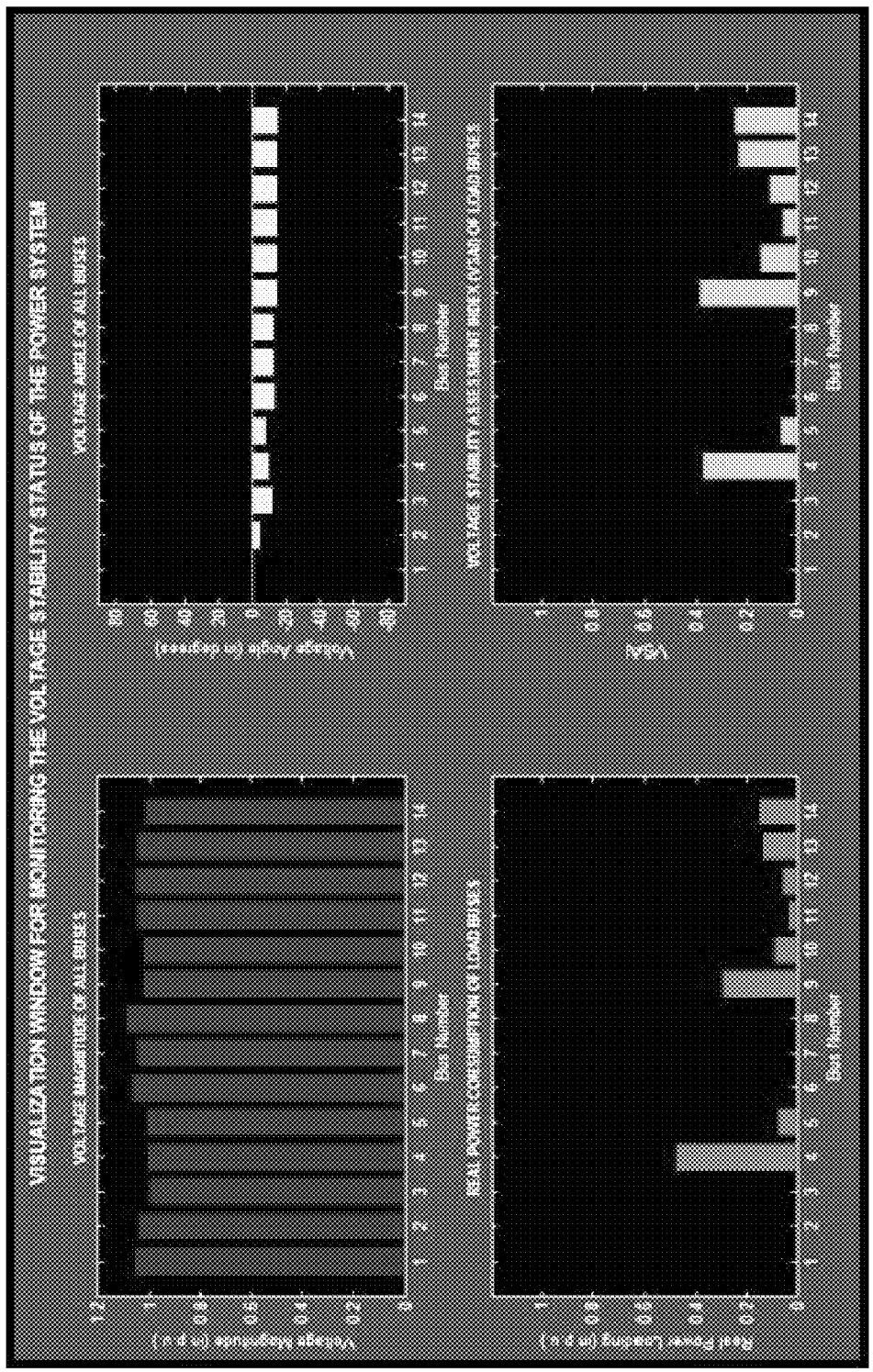
FIGS. 4-19 illustrate example visualization windows for monitoring voltage stability in various example power systems in accordance with embodiments of the technology.
Figure 5:
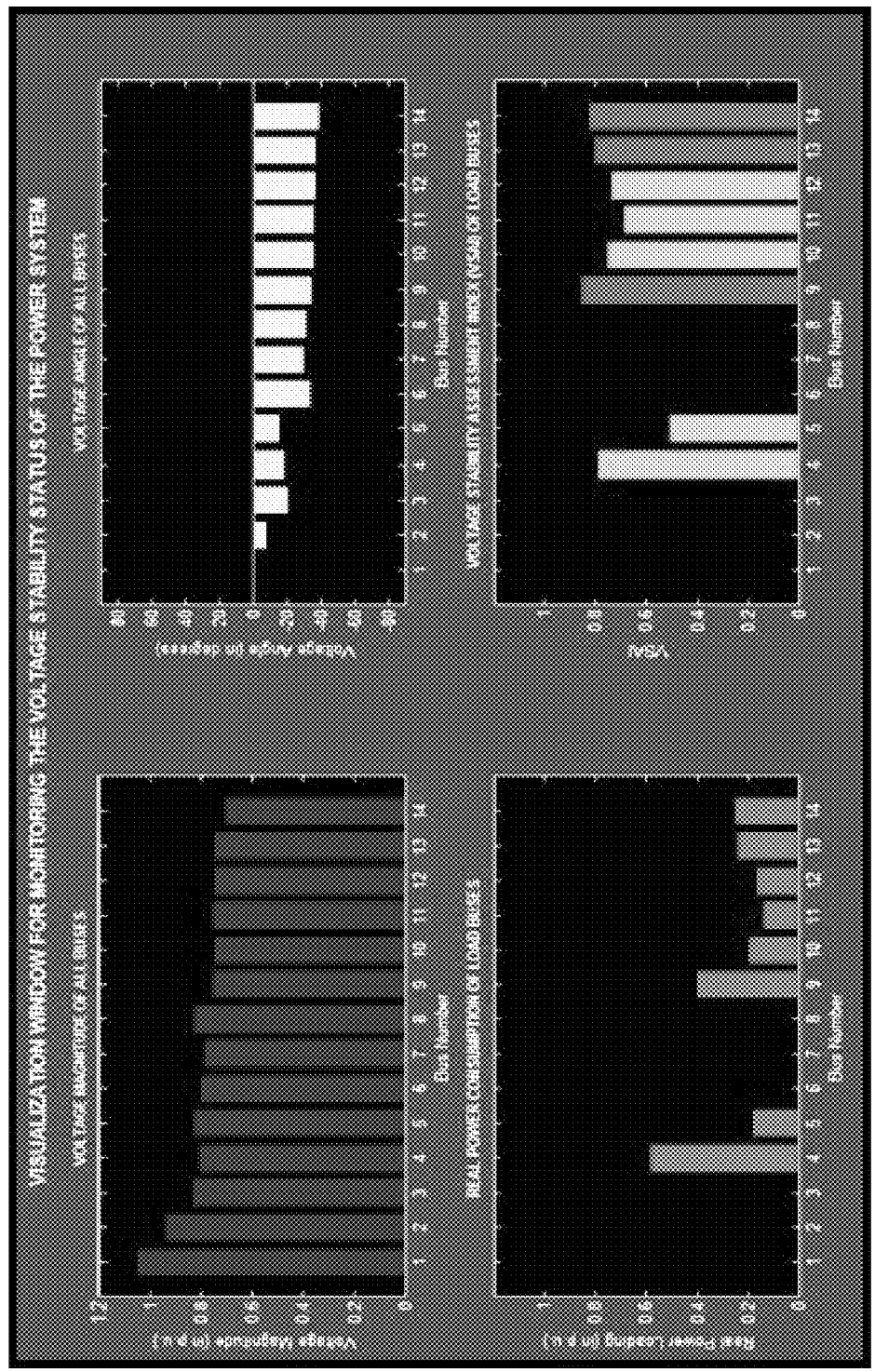

FIG. 4 illustrates a baseline operating condition in a power system with an IEEE-14 bus. As shown in FIG. 4, the power system is generally stable, and the most deterioration bus is Bus 9 with a VSAI of approximately 0.4. FIG. 5 illustrates a deterioration in voltage stability of the power system in FIG. 4 due to an increase in system loading. As shown in FIG. 5, the most unstable bus is Bus 9 with a VSAI of approximately 0.9.

Figure 6:
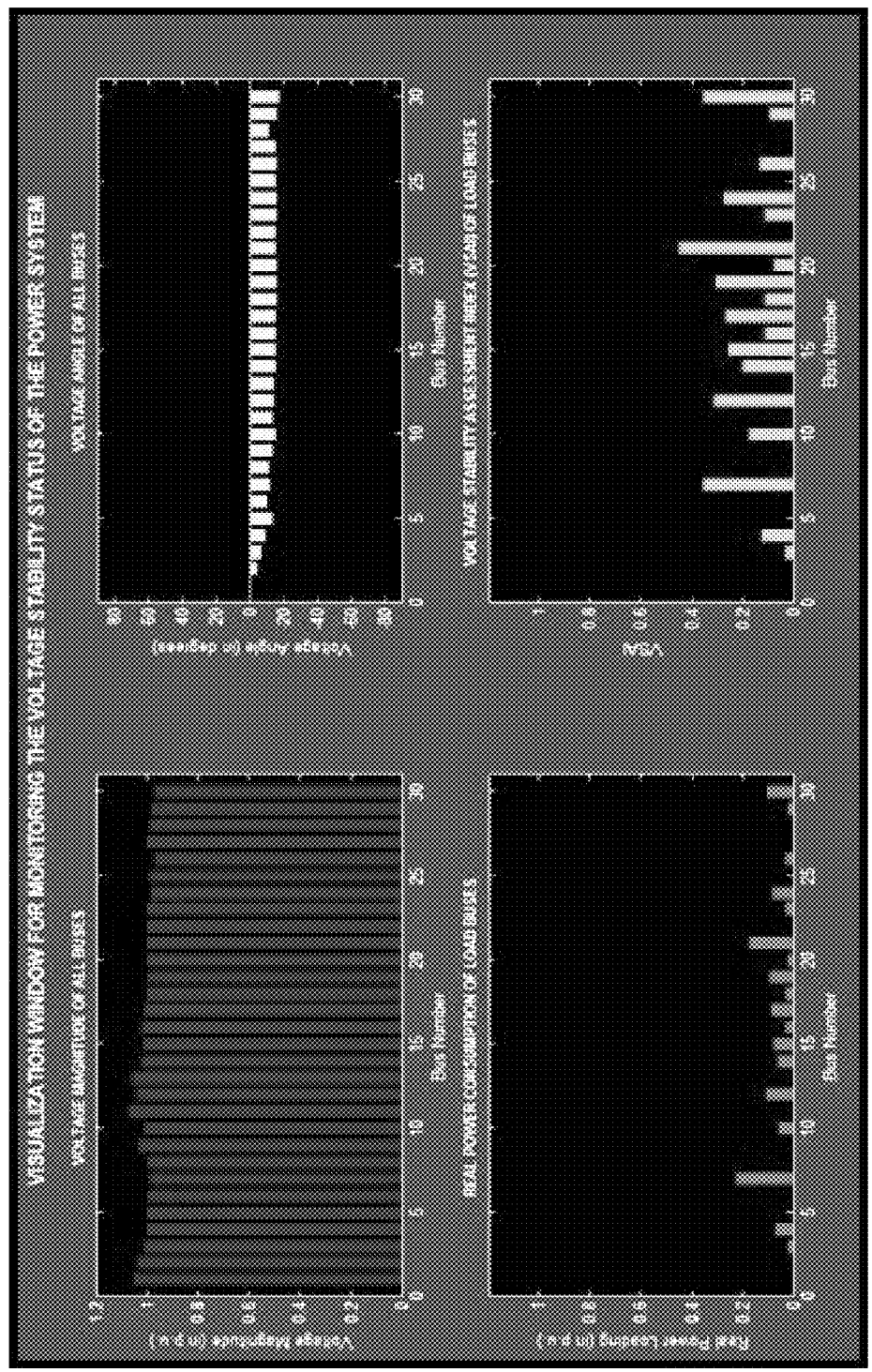
Figure 7:
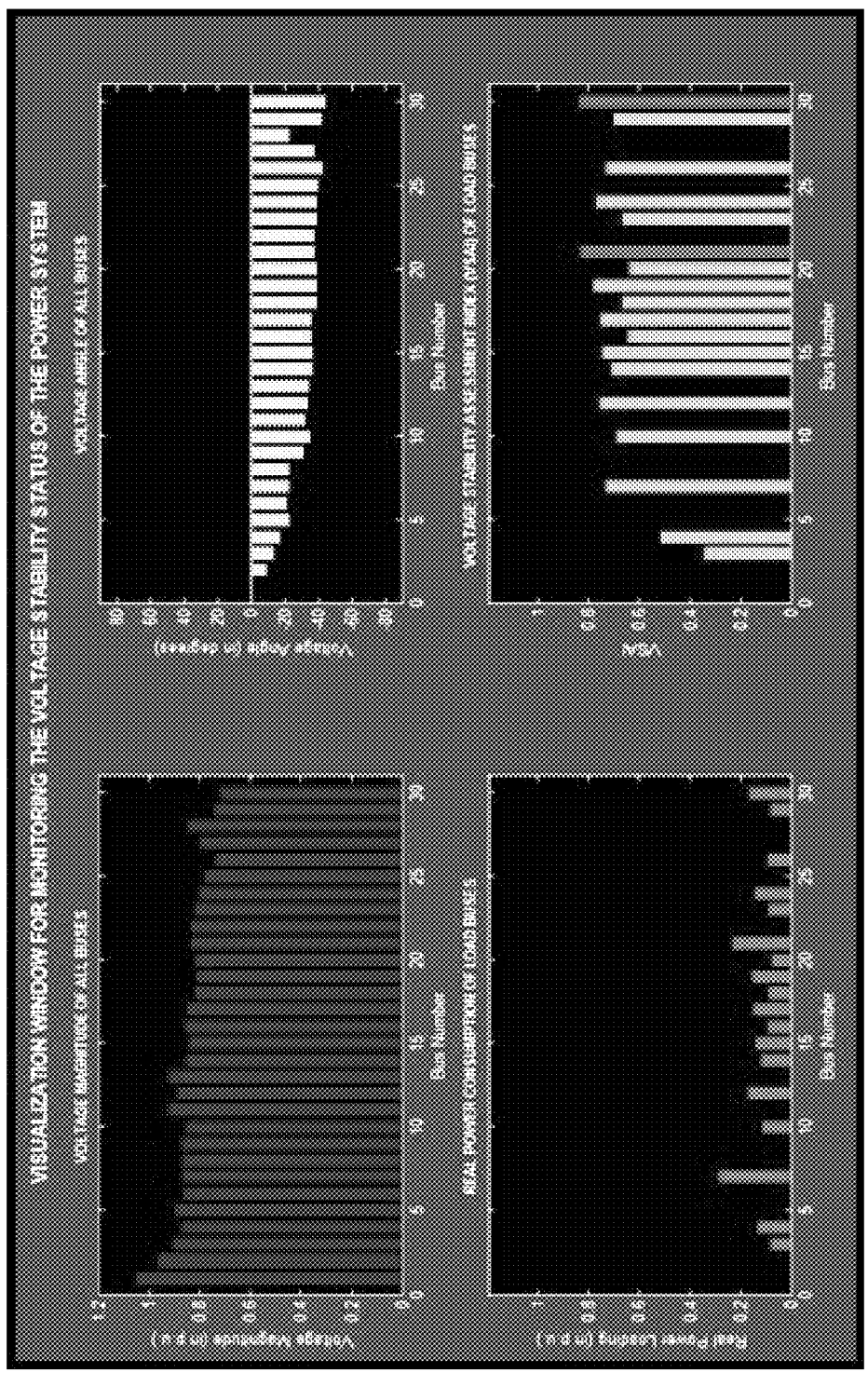

FIG. 6 illustrates a baseline operating condition in a power system with an IEEE-30 bus. As shown in FIG. 6, the power system is generally stable, and the most vulnerable bus is Bus 21 with a VSAI of approximately 0.5. FIG. 7 illustrates a deterioration in voltage stability of the power system in FIG. 6 due to an increase in system loading. As shown in FIG. 7, the most unstable bus is Bus 30 with a VSAI of approximately 0.8.

Figure 8:
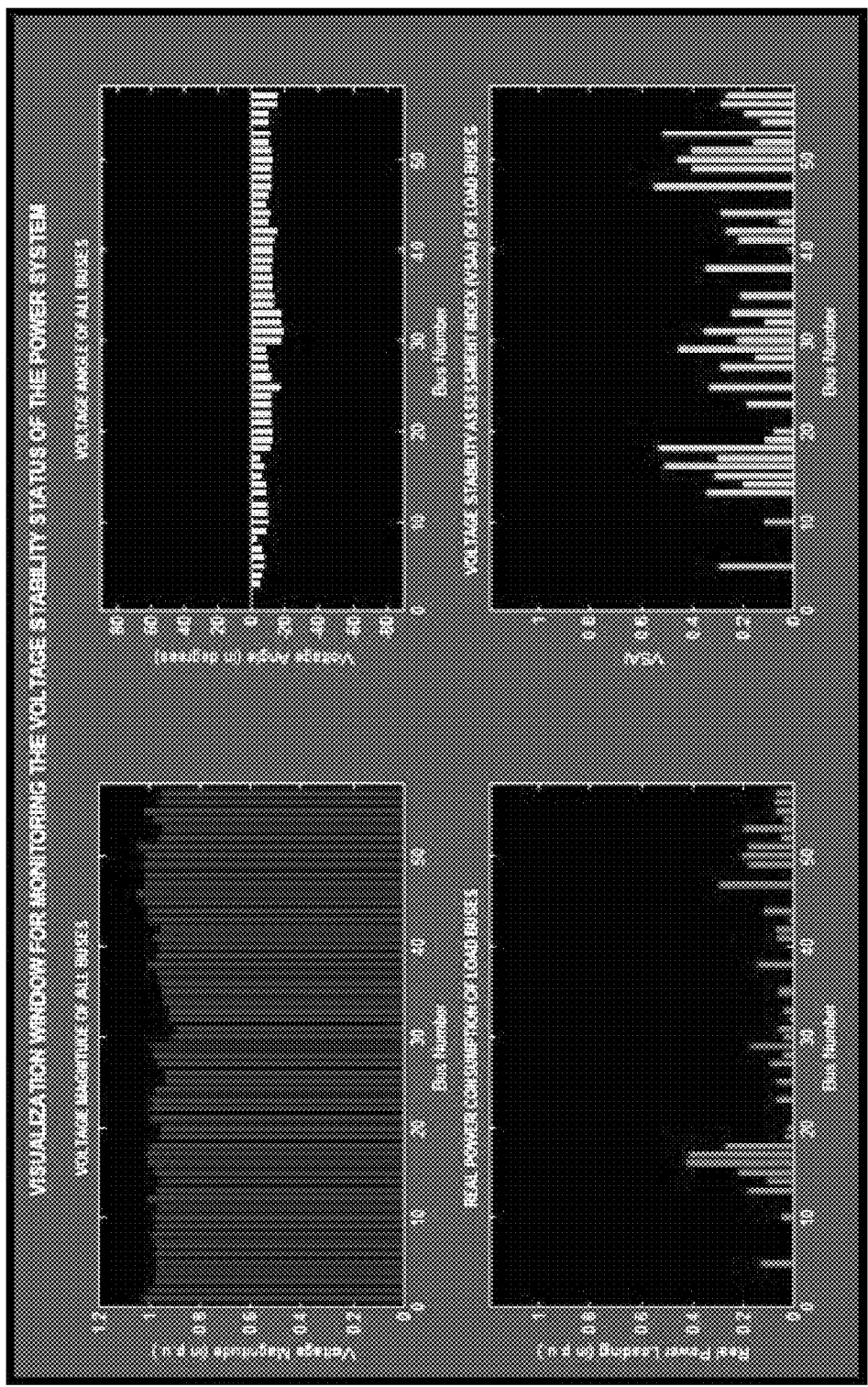
Figure 9:
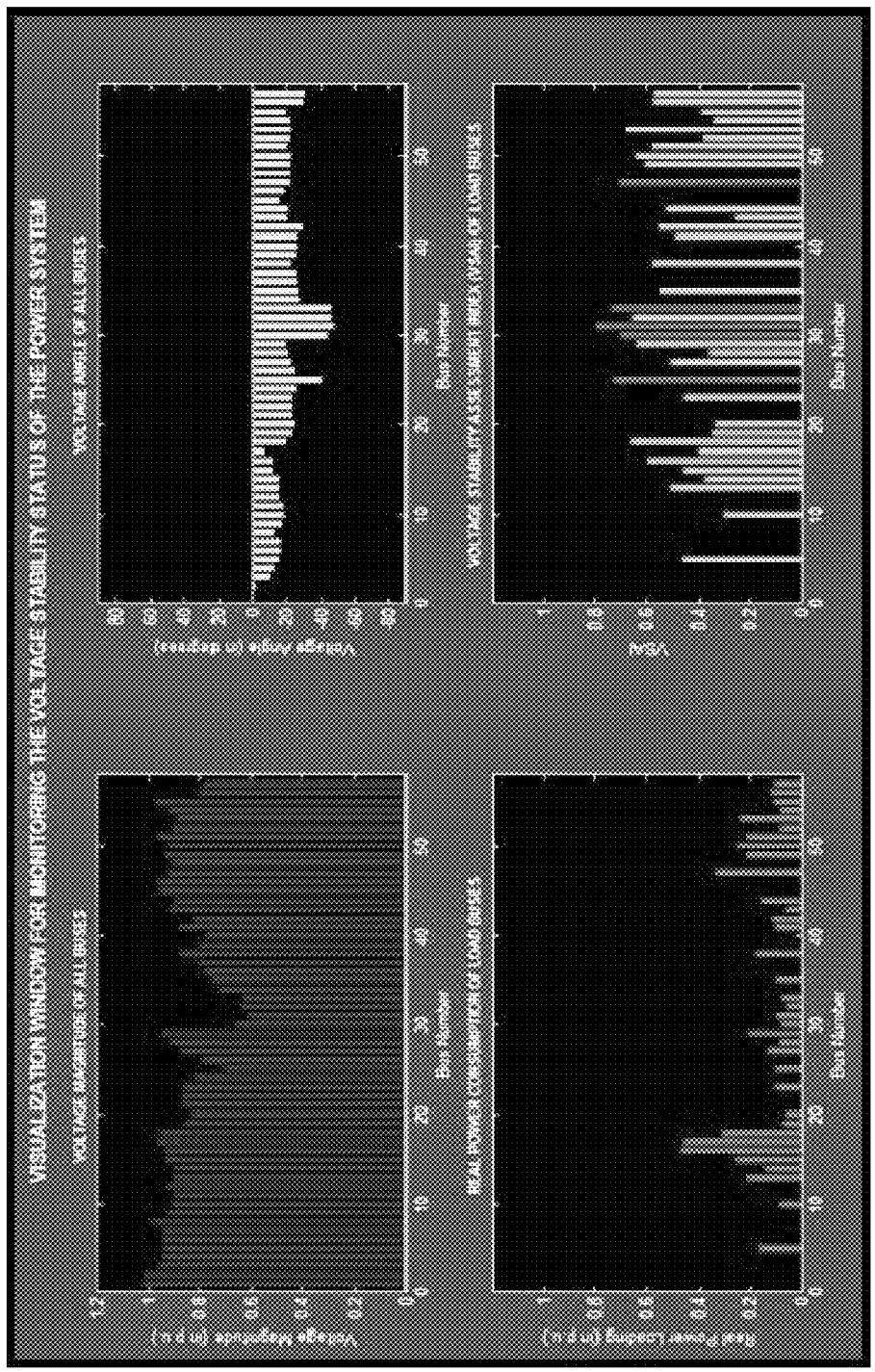

FIG. 8 illustrates a baseline operating condition in a power system with an IEEE-57 bus. As shown in FIG. 8, the power system is generally stable, and the most vulnerable bus is Bus 47 with a VSAI of approximately 0.6. FIG. 9 illustrates a deterioration in voltage stability of the power system in FIG. 8 due to an increase in system loading. As shown in FIG. 9, the most unstable bus is Bus 30 with a VSAI of approximately 0.8.

Figure 10:
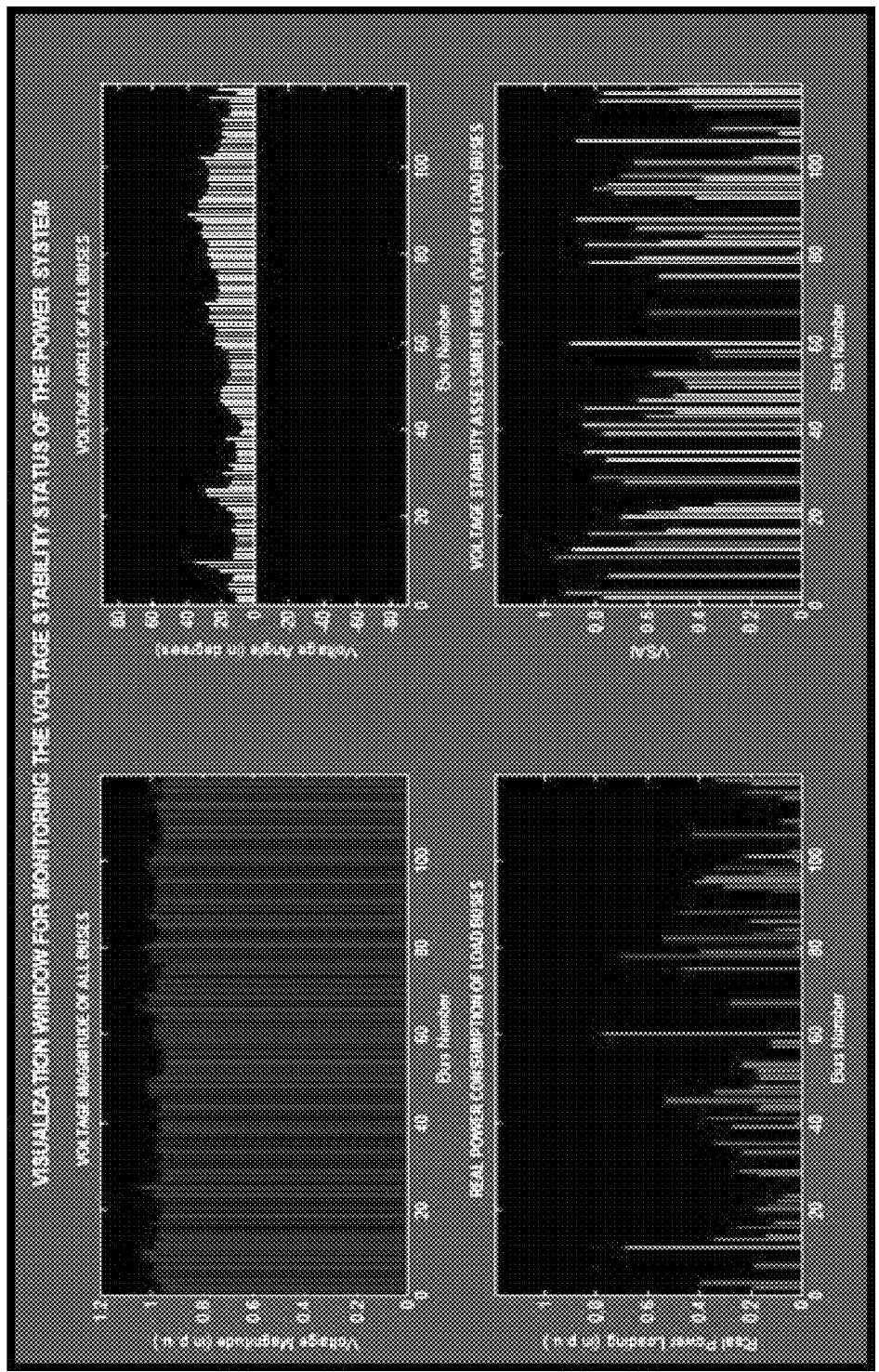
Figure 11:
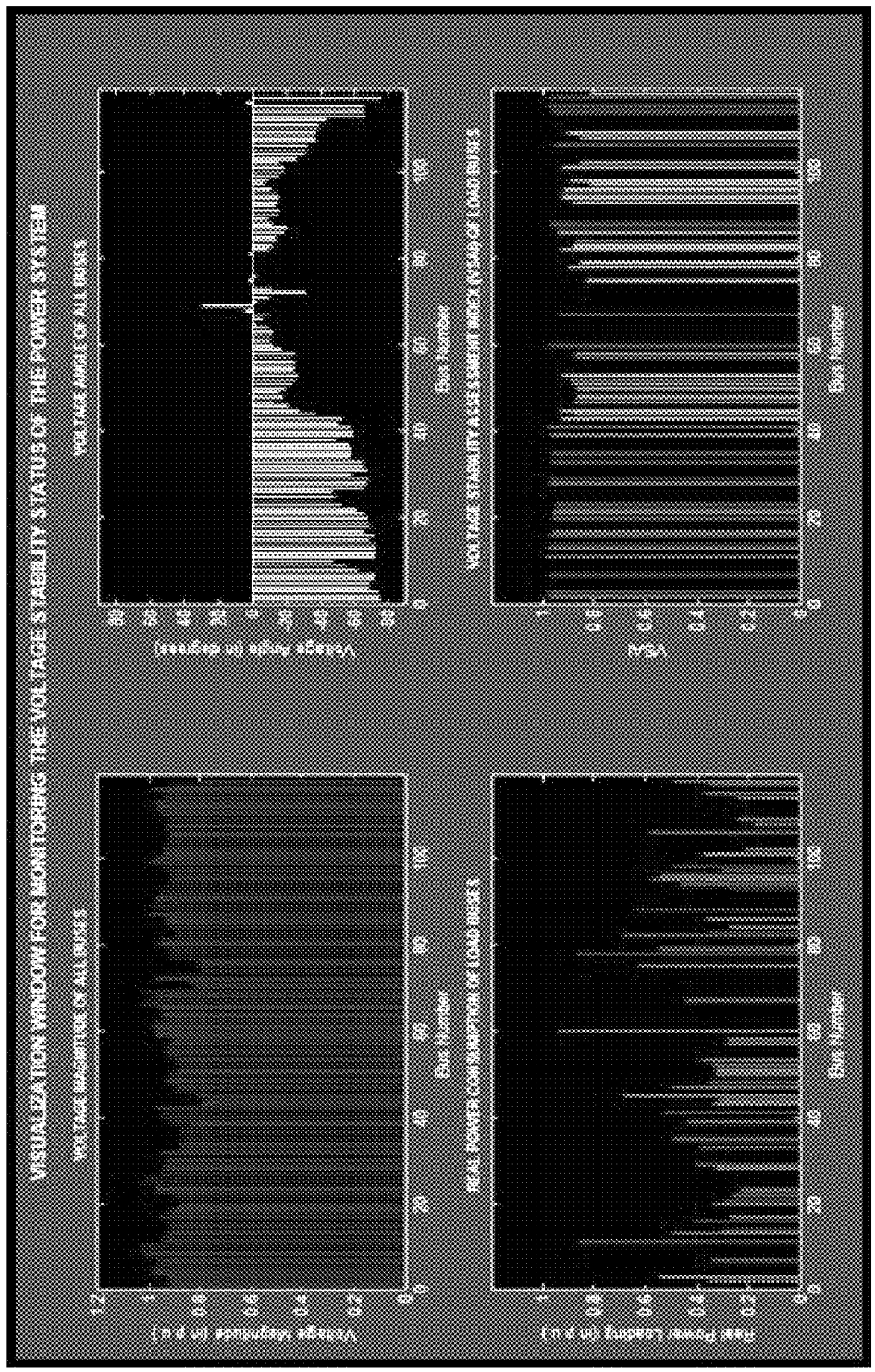

FIG. 10 illustrates a baseline operating condition in a power system with an IEEE-118 bus. As shown in FIG. 10, the power system is generally stable, and the most vulnerable bus is Bus 11 with a VSAI of approximately 0.9. FIG. 11 illustrates a deterioration in voltage stability of the power system in FIG. 10 due to an increase in system loading. As shown in FIG. 10, the most unstable bus is Bus 11 with a VSAI of almost 1.0.

Figure 12:
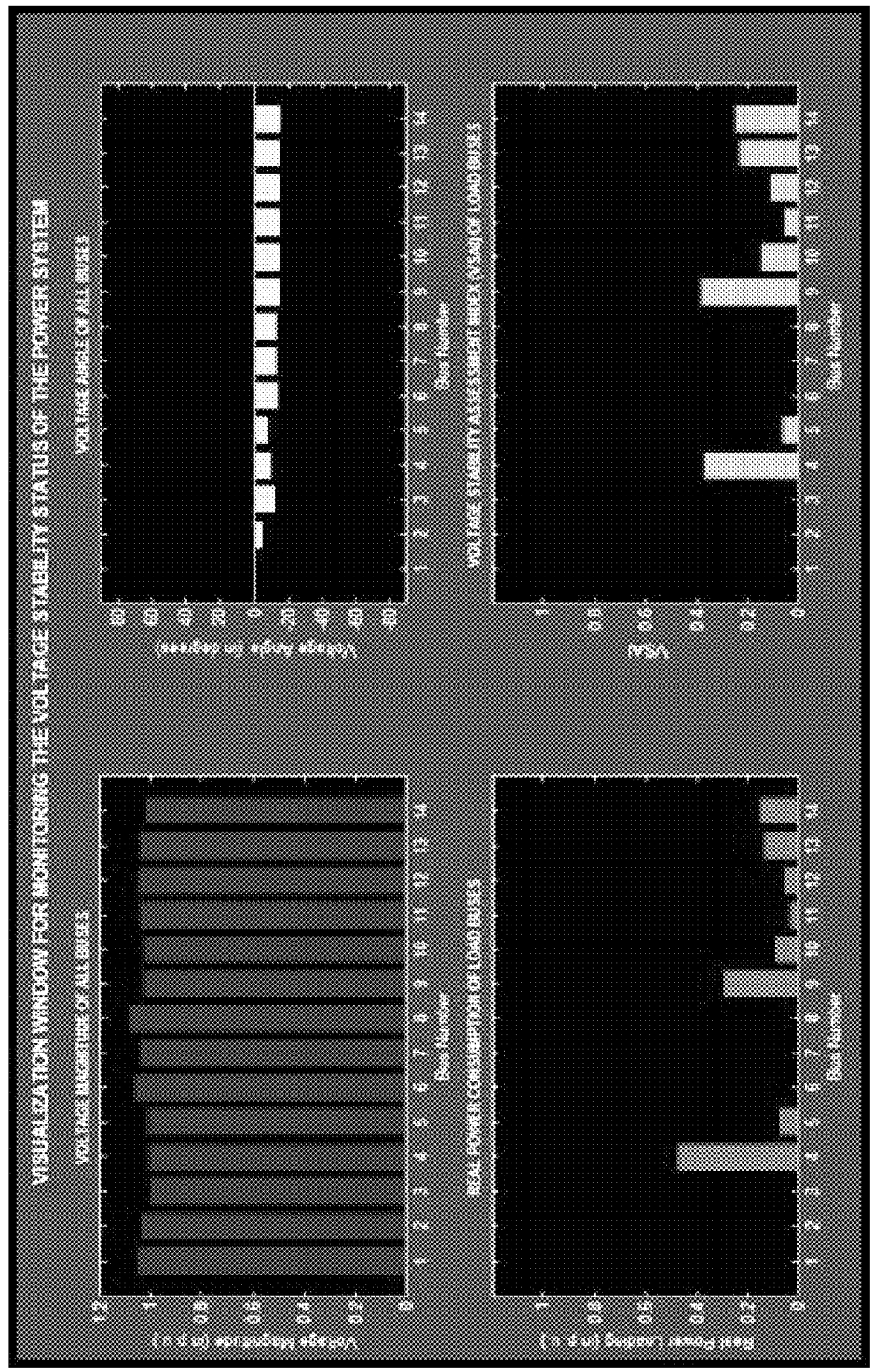
Figure 13:
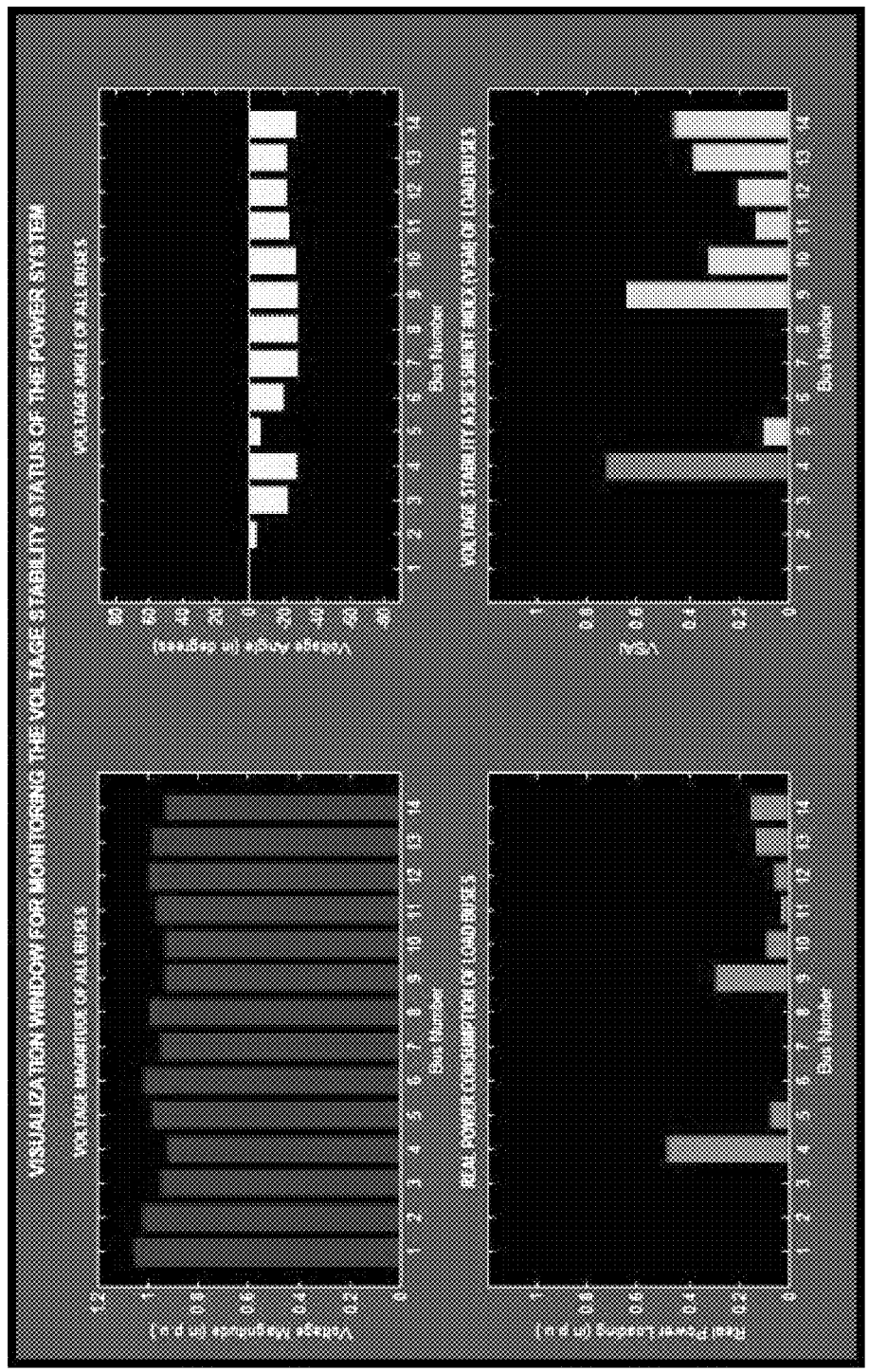

FIG. 12 illustrates a baseline operating condition in a power system with an IEEE-14 bus without sudden contingencies (e.g., line trips). As shown in FIG. 12, the power system is generally stable, and the most vulnerable bus is Bus 9 with a VSAI of approximately 0.4. FIG. 13 illustrates a deterioration in voltage stability of the power system in FIG. 12 due to two line trips between two pairs of buses. As shown in FIG. 13, the most unstable bus is Bus 4 with a VSAI of almost 0.8.

Figure 14:
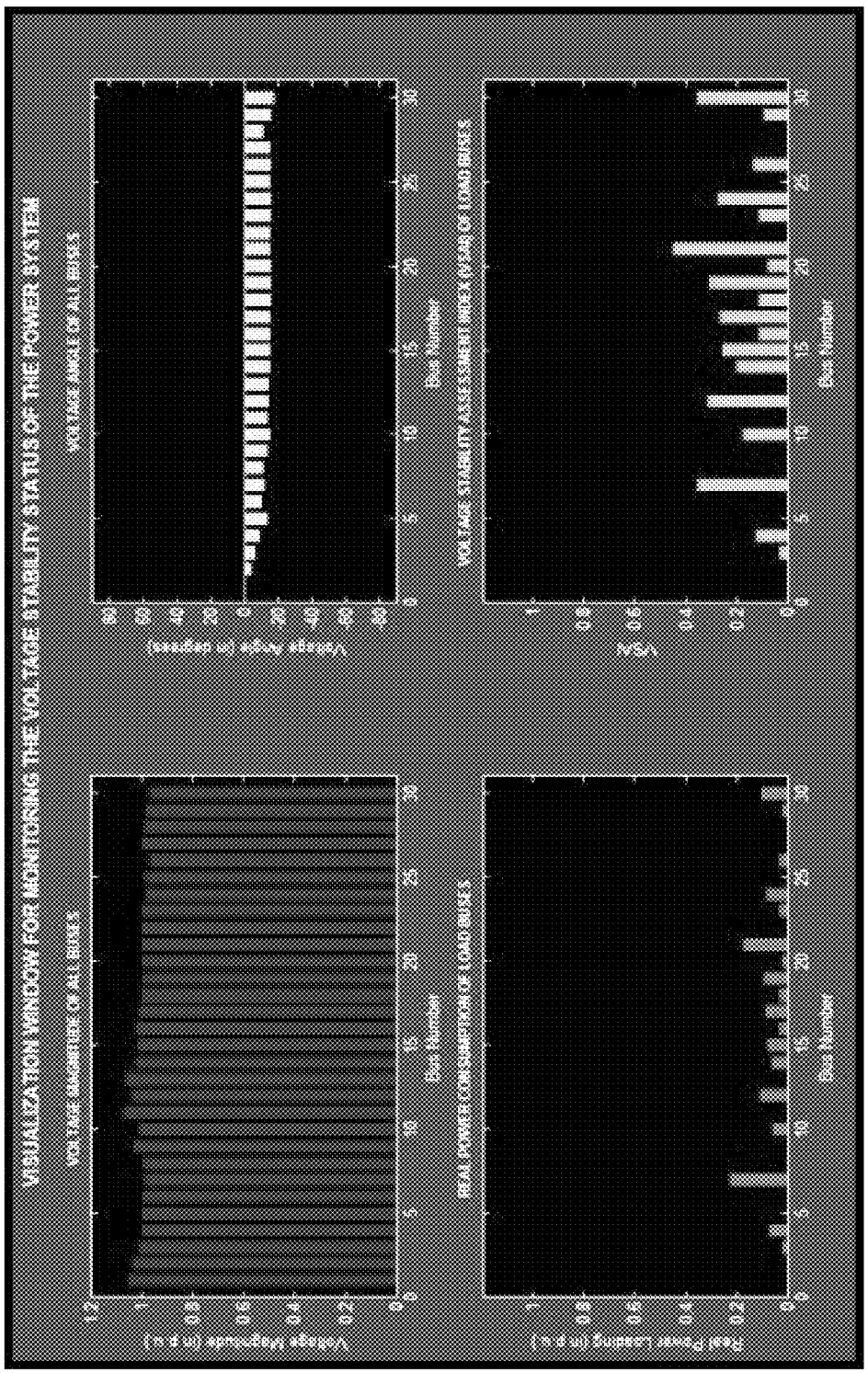
Figure 15:
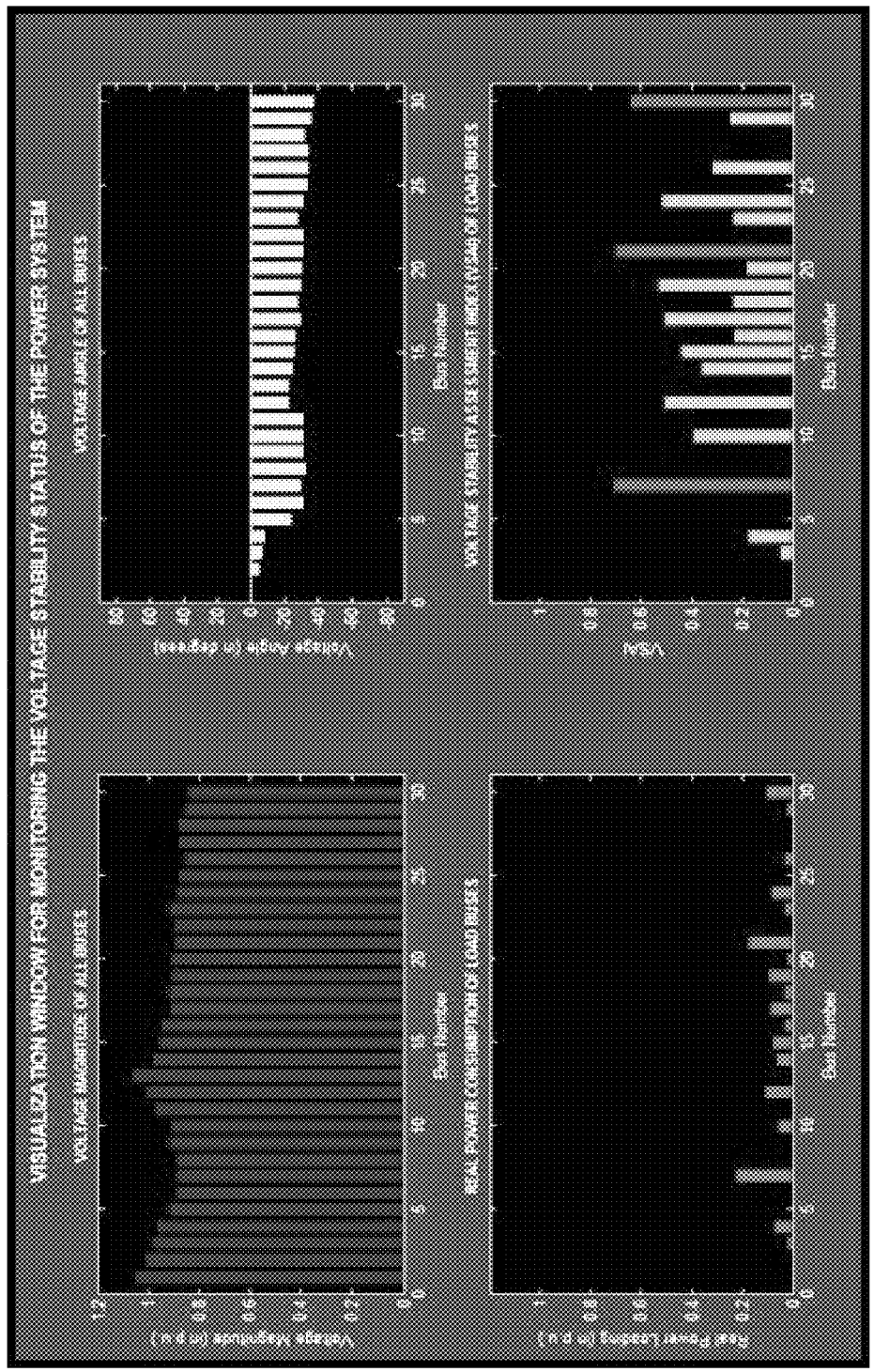

FIG. 14 illustrates a baseline operating condition in a power system with an IEEE-30 bus without sudden contingencies (e.g., line trips). As shown in FIG. 14, the power system is generally stable, and the most vulnerable bus is Bus 21 with a VSAI of approximately 0.5. FIG. 15 illustrates a deterioration in voltage stability of the power system in FIG. 14 due to two line trips between two pairs of buses. As shown in FIG. 15, Buses 6, 21, and 30 became more unstable with a VSAI of approximately 0.7.

Figure 16:
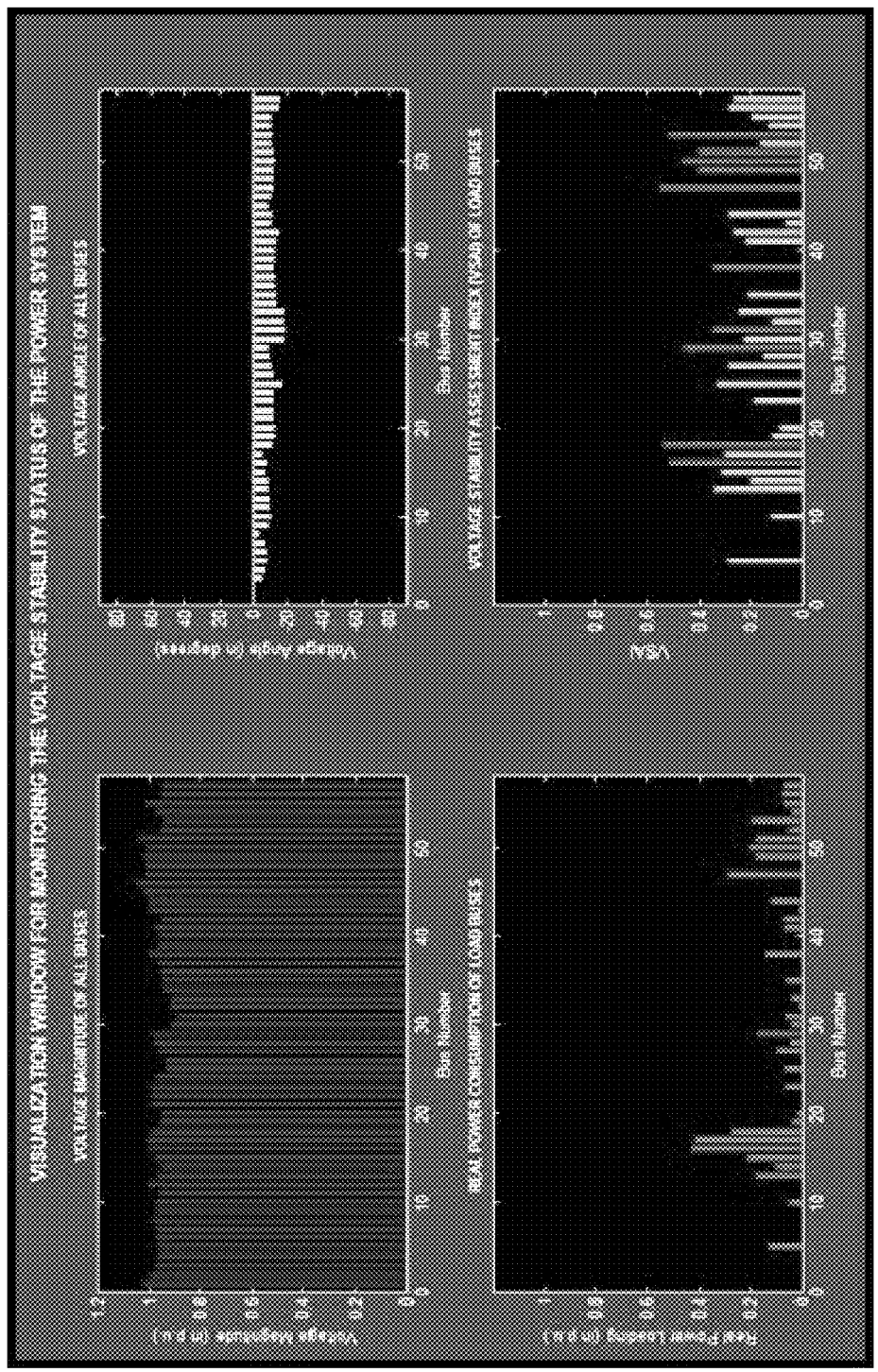
Figure 17:
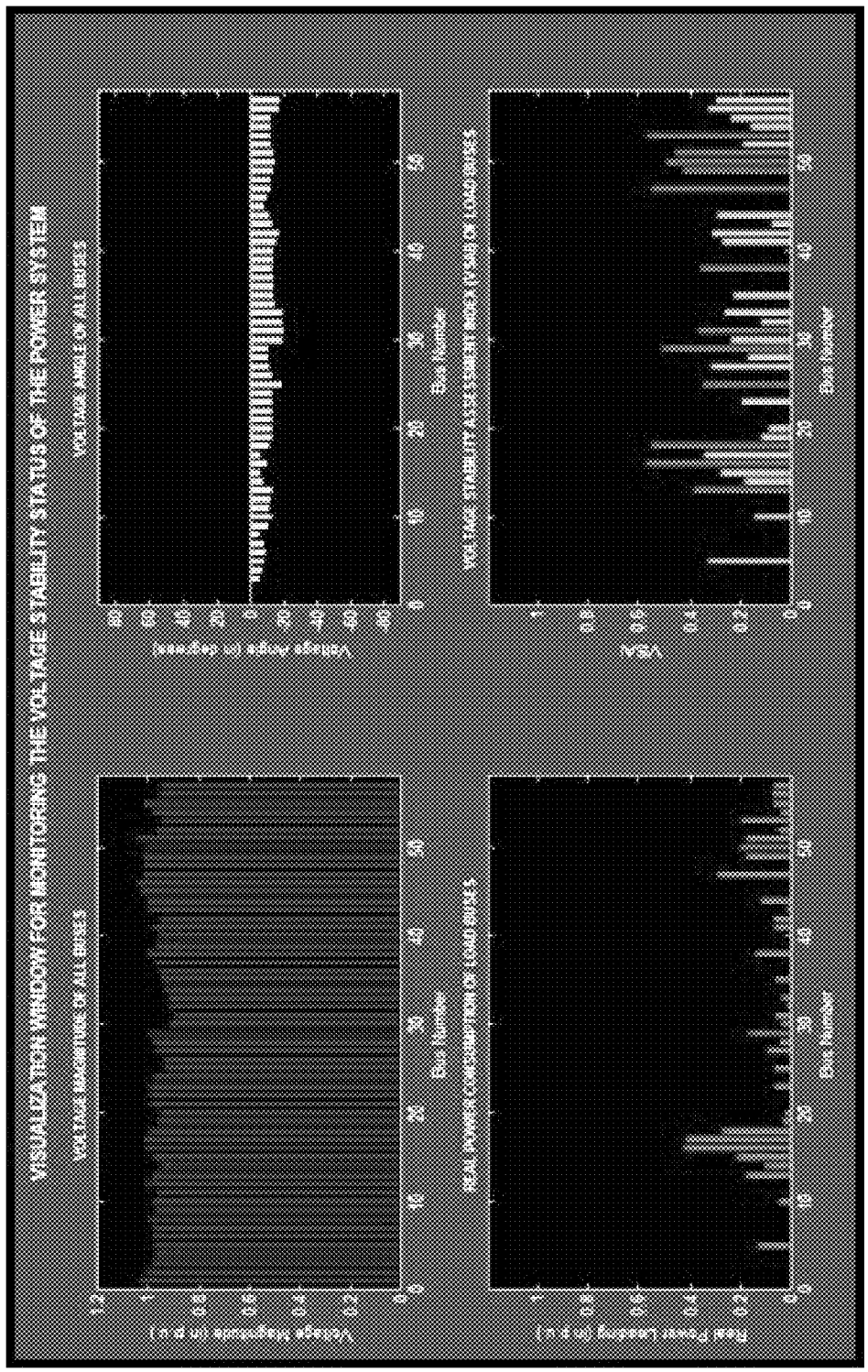

FIG. 16 illustrates a baseline operating condition in a power system with an IEEE-57 bus without sudden contingencies (e.g., line trips). As shown in FIG. 16, the power system is generally stable, and the most vulnerable buses are Buses 16, 18, 29, 31, 39, 45, 48, 49, 50, 51, and 54 with a VSAI of above about 0.4. FIG. 17 illustrates a deterioration in voltage stability of the power system in FIG. 16 due to four line trips between four pairs of buses. As shown in FIG. 17, VSAI values of the foregoing buses all increased.

Figure 18:
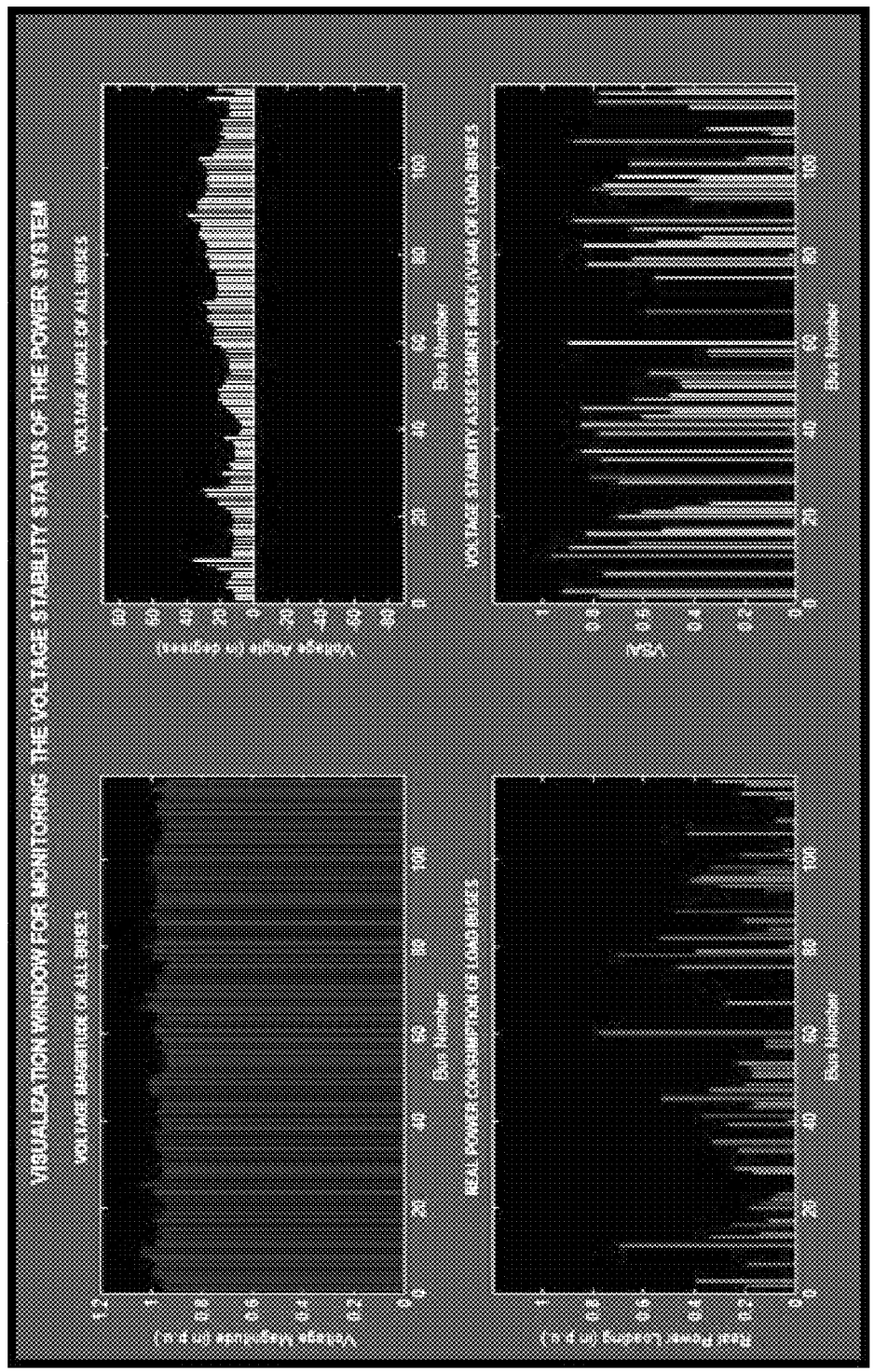
Figure 19:
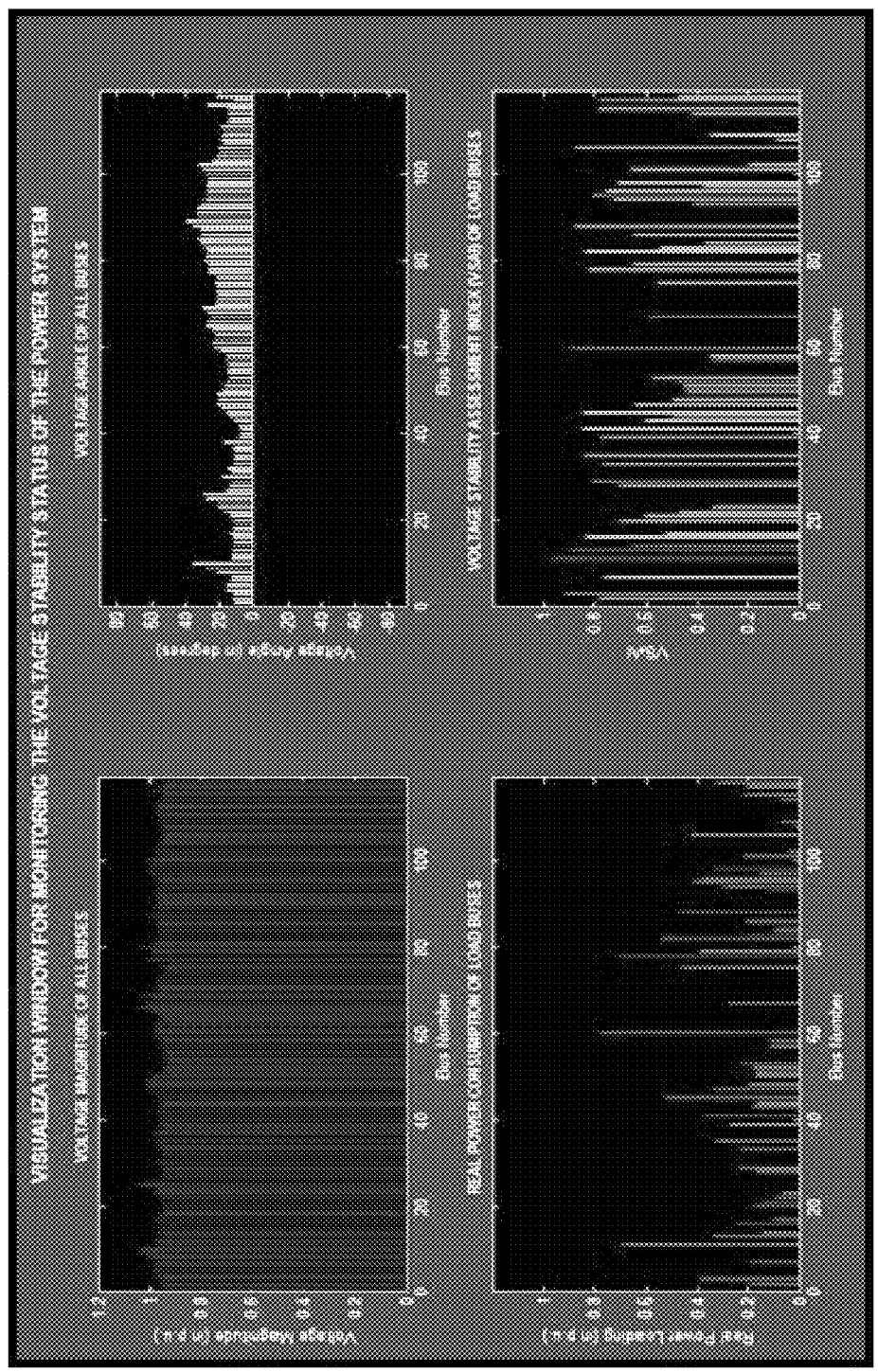

FIG. 18 illustrates a baseline operating condition in a power system with an IEEE-118 bus without sudden contingencies (e.g., line trips). As shown in FIG. 18, the power system is generally stable, and the most vulnerable bus is Bus 13 with a VSAI of above about 0.9. FIG. 19 illustrates a deterioration in voltage stability of the power system in FIG. 18 due to a line trip between a pair of buses. As shown in FIG. 19, VSAI values of all affected buses have increased.

FIG. 20 is a computing device 2000 suitable for certain components of the computing framework 100 in FIG. 1. For example, the computing device 2000 may be suitable for the PDC 116 or the supervisory computing station 118 of FIG. 1. In a very basic configuration 2002, computing device 2000 typically includes one or more processors 2004 and a system memory 2006. A memory bus 2008 may be used for communicating between processor 2004 and system memory 2006.

Depending on the desired configuration, the processor 2004 may be of any type including but not limited to a microprocessor (μP), a microcontroller (μC), a digital signal processor (DSP), or any combination thereof. The processor 2004 may include one more levels of caching, such as a level one cache 2010 and a level two cache 2012, a processor core 2014, and registers 2016. An example processor core 2014 may include an arithmetic logic unit (ALU), a floating point unit (FPU), a digital signal processing core (DSP Core), or any combination thereof. An example memory controller 2018 may also be used with processor 2004, or in some implementations memory controller 2018 may be an internal part of processor 2004.

Depending on the desired configuration, the system memory 2006 may be of any type including but not limited to volatile memory (such as RAM), non-volatile memory (such as ROM, flash memory, etc.) or any combination thereof. The system memory 2006 may include an operating system 2020, one or more applications 2022, and program data 2024. This described basic configuration 2002 is illustrated in FIG. 20 by those components within the inner dashed line.

The computing device 2000 may have additional features or functionality, and additional interfaces to facilitate communications between basic configuration 2002 and any other devices and interfaces. For example, a bus/interface controller 2030 may be used to facilitate communications between the basic configuration 2002 and one or more data storage devices 2032 via a storage interface bus 2034. The data storage devices 2032 may be removable storage devices 2036, non-removable storage devices 2038, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 2006, removable storage devices 2036 and non-removable storage devices 2038 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 2000. Any such computer storage media may be part of computing device 2000. The term "computer storage medium" excludes propagated signals and communication media.

The computing device 2000 may also include an interface bus 2040 for facilitating communication from various interface devices (e.g., output devices 2042, peripheral interfaces 2044, and communication devices 2046) to the basic configuration 2002 via bus/interface controller 2030. Example output devices 2042 include a graphics processing unit 2048 and an audio processing unit 2050, which may be configured to communicate to various external devices such as a display or speakers via one or more A/V ports 2052. Example peripheral interfaces 2044 include a serial interface controller 2054 or a parallel interface controller 2056, which may be configured to communicate with external devices such as input devices (e.g., keyboard, mouse, pen, voice input device, touch input device, etc.) or other peripheral devices (e.g., printer, scanner, etc.) via one or more I/O ports 2058. An example communication device 2046 includes a network controller 2060, which may be arranged to facilitate communications with one or more other computing devices 2062 over a network communication link via one or more communication ports 2064.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 2000 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 2000 may also be implemented as a personal computer including both laptop computer and non-laptop computer configurations.

From the foregoing, it will be appreciated that specific embodiments of the technology have been described herein for purposes of illustration, but that various modifications may be made without deviating from the disclosure. In addition, many of the elements of one embodiment may be combined with other embodiments in addition to or in lieu of the elements of the other embodiments. Accordingly, the disclosure is not limited except as by the appended claims.

We claim:

1. A computing system, comprising:
a processor;
a memory operatively coupled to the processor, the memory containing instructions that when executed by the processor cause the processor to perform a process including:
receiving data, via a computer network, from phasor measurement units located at corresponding power buses in a power system, the received data representing a set of system parameters of the power system under a load condition, the set of system parameters including a voltage magnitude and a voltage angle of the individual power buses in the power system;
estimating one or more additional sets of the system parameters under one or more additional load conditions different than the load condition based on the received data representing the set of system parameters and topology information of the power system, the topology information including connectivity information between pairs of the power buses in the power system, wherein the one or more additional sets of the system parameters each include another voltage magnitude and another voltage angle of the individual power buses in the power system under one of the additional load conditions;
determining a real-time voltage stability index for the power system based on both the received set and the estimated one or more sets of the system parameters; and
raising an alarm for potential voltage collapse in the power system when the determined real-time voltage stability index is above a preset threshold,
wherein estimating one or more additional sets of system parameters includes:
selecting one or more power perturbations (Delta) as follows:

$$\text{Delta} = \begin{bmatrix} [\Delta PL] \\ [\Delta QL] \end{bmatrix}_{[(2 \times Total\ No.\ of\ buses) - (No.\ of\ generator\ buses) - 2]}$$

where $\Delta PL$ is real power perturbation and $\Delta QL$ is reactive power perturbation; and calculating the one or more set of system parameters as follows:

$$\begin{bmatrix} [\Delta VL1] \\ [\Delta \delta L1] \end{bmatrix} = \begin{bmatrix} \left[\frac{\partial P}{\partial \delta}\right] & \left[\frac{\partial P}{\partial |V|}\right] \\ \left[\frac{\partial Q}{\partial \delta}\right] & \left[\frac{\partial Q}{\partial |V|}\right] \end{bmatrix} \times \begin{bmatrix} [\Delta PL] \\ [\Delta QL] \end{bmatrix}$$

$$[VL1] = [VL] + [\Delta VL1]$$

where $\Delta VL1$ is voltage perturbation; VL is measured line voltage; VL1 is estimated voltage; and $\Delta \delta L1$ is an estimated phase angle change at a line voltage VL1; P is real power; $\delta$ is phase angle; Q is reactive power; V is voltage.

2. The computing system of claim 1 wherein the process performed by the processor further includes:
  estimating a Thevenin's equivalent impedance based on the received data and the estimated one or more sets of additional system parameters; and
  wherein determining the voltage stability index includes determining the voltage stability index based on the estimated Thevenin's equivalent impedance.

3. The computing system of claim 1 wherein:
  estimating the one or more additional sets of system parameters includes estimating first and second sets of the system parameters based on the received data, the topology information of the power system, and a power perturbation in the power system;
  the process performed by the processor further includes estimating a Thevenin's equivalent impedance based on the received data and the estimated first and second sets of system parameters; and
  determining the voltage stability index includes determining the voltage stability index based on the estimated Thevenin's equivalent impedance.

4. The computing system of claim 1 wherein:
  estimating the one or more additional sets of system parameters includes estimating first and second sets of the system parameters based on the received data, the topology information of the power system, and a power perturbation in the power system, the power perturbation is 0.01% to 0.1% of a current load of the power system;
  the process performed by the processor further includes estimating a Thevenin's equivalent impedance based on the received data and the estimated first and second sets of system parameters; and
  determining the voltage stability index includes determining the voltage stability index based on the estimated Thevenin's equivalent impedance.

5. The computing system of claim 1 wherein estimating one or more additional sets of the system parameters includes:
  estimating the one or more additional sets of system parameters includes estimating first and second sets of the system parameters based on the received data, the topology information of the power system, a positive value of a power perturbation in the power system, and a negative value of the power perturbation in the power system, the power perturbation is 0.01% to 0.1% of a current load of the power system;
  the process performed by the processor further includes estimating a Thevenin's equivalent impedance based on the received data and the estimated first and second sets of system parameters; and
  determining the voltage stability index includes determining the voltage stability index based on the estimated Thevenin's equivalent impedance.

6. The computing system of claim 1 wherein:
  estimating the one or more additional sets of system parameters includes estimating first and second sets of the system parameters based on the received data, the topology information of the power system, a positive value of a power perturbation in the power system, and a negative value of the power perturbation in the power system;
  the process performed by the processor further includes
    estimating a first Thevenin's equivalent impedance based on the received data and the estimated first set of system parameters;
    estimating a second Thevenin's equivalent impedance based on the received data and the estimated second set of system parameters; and
    estimating a final Thevenin's equivalent impedance based on the first and second estimated Thevenin's equivalent impedances; and
  determining the voltage stability index includes determining the voltage stability index based on the estimated final Thevenin's equivalent impedance.

7. The computing system of claim 1 wherein estimating one or more sets of the system parameters includes:
  estimating the one or more additional sets of system parameters includes estimating first and second sets of the system parameters based on the received data, the topology information of the power system, a positive value of a power perturbation in the power system, and a negative value of the power perturbation in the power system;
  the process performed by the processor further includes
    estimating a first Thevenin's equivalent impedance based on the received data and the estimated first set of system parameters;
    estimating a second Thevenin's equivalent impedance based on the received data and the estimated second set of system parameters; and
    estimating a final Thevenin's equivalent impedance by averaging the first and second estimated Thevenin's equivalent impedances; and
  determining the voltage stability index includes determining the voltage stability index based on the estimated final Thevenin's equivalent impedance.

8. The computing system of claim 1 wherein the load condition is a predicted load condition, and wherein the process performed by the processor further includes:
  obtaining predicted load information of the power system under the predicted load condition; and
  deriving the data representing the set of system parameters of the power system based on the obtained predicted load information.

9. A computer readable storage medium containing instructions that when executed by a computing processor cause the computing processor to perform a process including:
  receiving data, via a computer network, from phasor measurement units located at corresponding power buses in a power system, the data representing a set of system parameters of the power system under a load condition, wherein the set of system parameters includes a voltage magnitude and a voltage angle of individual power buses in the power system;
  determining a representation of a system profile of the power system based on the received set of system parameters and topology information of the power system, the topology information including connectivity information between pairs of the power buses in the power system;
  estimating one or more additional sets of the system parameters under one or more additional load conditions based on the determined system profile, the one or more additional sets of the system parameters each including another voltage magnitude and another voltage angle of the individual power buses in the power system under one of the additional load conditions;
  determining a real-time voltage stability index for the power system based on both the received set of system parameters and the estimated one or more additional sets of the system parameters; and
  raising an alarm for potential voltage collapse in the power system when the determined real-time voltage stability index is above a preset threshold, wherein determining the system profile includes calculating a Jacobian matrix based on the received set of system parameters and the topology information as follows:

$$\text{Jacobian Matrix} = \begin{bmatrix} \left[\frac{\partial P}{\partial \delta}\right] & \left[\frac{\partial P}{\partial |V|}\right] \\ \left[\frac{\partial Q}{\partial \delta}\right] & \left[\frac{\partial Q}{\partial |V|}\right] \end{bmatrix}_{[(2\times\text{Total No. of buses})-(\text{No. of generator buses})-2]\times[(2\times\text{Total No. of buses})-(\text{No. of generator buses})-2]}$$

$Pi=\Sigma_{j=1}^{n}|Vi|*|Vj|*|Yij|*\cos(\delta i-\delta j-\theta ij)$, where $i \in$ each bus & $j \in$ every other bus $Qi=\Sigma_{j=1}^{n}|Vi|*|Vj|*|Yij|*\sin(\delta i-\delta j-\theta ij)$, where $i \in$ each bus & $j \in$ every other bus where Pi is a real power of bus i; Qi is reactive power of bus i; σi is a phase angle of bus I; Vi is a voltage of bus i; Vj is a voltage of bus j; Yij is a voltage relation between buses i and j; and θij is a phase angle relation between buses i and j; P is real power; δ is phase angle; Q is reactive power; V is voltage.

10. The computer readable storage medium of claim 9 wherein estimating one or more additional sets of system parameters includes:
selecting one or more power perturbations (Delta) as follows:

$$\text{Delta} = \begin{bmatrix} [\Delta PL] \\ [\Delta QL] \end{bmatrix}_{[(2\times\text{Total No. of buses})-(\text{No. of generator buses})-2]}$$

where $\Delta PL$ is real power perturbation and $\Delta QL$ is reactive power perturbation; and calculating the one or more set of system parameters as follows:

$$\begin{bmatrix} [\Delta VL1] \\ [\Delta \delta L1] \end{bmatrix} = \begin{bmatrix} \left[\frac{\partial P}{\partial \delta}\right] & \left[\frac{\partial P}{\partial |V|}\right] \\ \left[\frac{\partial Q}{\partial \delta}\right] & \left[\frac{\partial Q}{\partial |V|}\right] \end{bmatrix} \times \begin{bmatrix} [\Delta PL] \\ [\Delta QL] \end{bmatrix}$$

$[VL1] = [VL] + [\Delta VL1]$ where $\Delta VL1$ is voltage perturbation; VL is measured line voltage; VL1 is estimated voltage; and $\Delta \delta L1$ is an estimated phase angle change at a line voltage VL1; P is real power; δ is phase angle; Q is reactive power; V is voltage.

11. The computer readable storage medium of claim 9 wherein determining the voltage stability index includes:
calculating a Thevenin's equivalent impedance (Zthi) for each power bus of the power system as follows:

$$\overline{Zth1}_i = \frac{\overline{VL_i} - \overline{VL1}_i}{\overline{IL1}_i - \overline{IL}_i} \text{ for } i \in \text{All Load Buses} \neq \text{Zero Injection Buses;}$$

and
calculating a voltage stability index (VSI) for each of the power bus as follows:

$$VSI_i = \frac{|\overline{Zth}|_i}{|\overline{ZL}|_i}$$

where $\overline{VL}_i$ is measured voltage of line i; $\overline{VL1}_i$ is estimated voltage of line i; $\overline{IL1}_i$ is estimated current of line i; and $\overline{IL}_i$ is measured current of line i; $VSI_i$ is voltage stability index of bus; $|\overline{Zth}|_i$ is Thevenin's equivalent impedance of line based on i measured and estimated parameters; $|\overline{ZL}|_i$ is Thevenin's equivalent impedance based on measured parameters.

12. A method for monitoring voltage stability in a power system, the method comprising:
receiving data, via a computer network, from phasor measurement units located at corresponding power buses in a power system, the received data representing a set of system parameters of the power system under a load condition, the set of system parameters including a voltage magnitude and a voltage angle of the individual power buses in the power system;
estimating one or more additional sets of the system parameters under one or more additional load conditions different than the load condition based on the received data representing the set of system parameters and topology information of the power system, the topology information including connectivity information between pairs of the power buses in the power system, wherein the one or more additional sets of the system parameters each include another voltage magnitude and another voltage angle of the individual power buses in the power system under one of the additional load conditions;
determining a real-time voltage stability index for the power system based on both the received set and the estimated one or more sets of the system parameters; and
raising an alarm for potential voltage collapse in the power system when the determined real-time voltage stability index is above a preset threshold, wherein estimating one or more additional sets of system parameters includes:
selecting one or more power perturbations (Delta) as follows:

$$\text{Delta} = \begin{bmatrix} [\Delta PL] \\ [\Delta QL] \end{bmatrix}_{[(2\times\text{Total No. of buses})-(\text{No. of generator buses})-2]}$$

where $\Delta PL$ is real power perturbation and $\Delta QL$ is reactive power perturbation; and
calculating the one or more set of system parameters as follows:

$$\begin{bmatrix} [\Delta VL1] \\ [\Delta \delta L1] \end{bmatrix} = \begin{bmatrix} \left[\frac{\partial P}{\partial \delta}\right] & \left[\frac{\partial P}{\partial |V|}\right] \\ \left[\frac{\partial Q}{\partial \delta}\right] & \left[\frac{\partial Q}{\partial |V|}\right] \end{bmatrix} \times \begin{bmatrix} [\Delta PL] \\ [\Delta QL] \end{bmatrix}$$

$[VL1] = [VL] + [\Delta VL1]$ where $\Delta VL1$ is voltage perturbation; VL is measured line voltage; VL1 is estimated voltage; and $\Delta \delta L1$ is an estimated phase angle change at a line voltage VL1; P is real power; δ is phase angle; Q is reactive power; V is voltage.

13. The method of claim 12, further comprising:
estimating a Thevenin's equivalent impedance based on the received data and the estimated one or more sets of additional system parameters; and
wherein determining the voltage stability index includes determining the voltage stability index based on the estimated Thevenin's equivalent impedance.

14. The method of claim 12 wherein:
estimating the one or more additional sets of system parameters includes estimating first and second sets of the system parameters based on the received data, the topology information of the power system, and a power perturbation in the power system, the power perturbation is 0.01% to 0.1% of a current load of the power system;

the process performed by the processor further includes estimating a Thevenin's equivalent impedance based on the received data and the estimated first and second sets of system parameters; and determining the voltage stability index includes determining the voltage stability index based on the estimated Thevenin's equivalent impedance.

15. The method of claim 12 wherein estimating one or more additional sets of the system parameters includes:

estimating the one or more additional sets of system parameters includes estimating first and second sets of the system parameters based on the received data, the topology information of the power system, a positive value of a power perturbation in the power system, and a negative value of the power perturbation in the power system, the power perturbation is 0.01% to 0.1% of a current load of the power system;

the process performed by the processor further includes estimating a Thevenin's equivalent impedance based on the received data and the estimated first and second sets of system parameters; and determining the voltage stability index includes determining the voltage stability index based on the estimated Thevenin's equivalent impedance.

16. The method of claim 12 wherein:

estimating the one or more additional sets of system parameters includes estimating first and second sets of the system parameters based on the received data, the topology information of the power system, a positive value of a power perturbation in the power system, and a negative value of the power perturbation in the power system;

the method further includes:
estimating a first Thevenin's equivalent impedance based on the received data and the estimated first set of system parameters;
estimating a second Thevenin's equivalent impedance based on the received data and the estimated second set of system parameters; and
estimating a final Thevenin's equivalent impedance based on the first and second estimated Thevenin's equivalent impedances; and determining the voltage stability index includes determining the voltage stability index based on the estimated final Thevenin's equivalent impedance.

17. The method of claim 12 wherein estimating one or more sets of the system parameters includes:

estimating the one or more additional sets of system parameters includes estimating first and second sets of the system parameters based on the received data, the topology information of the power system, a positive value of a power perturbation in the power system, and a negative value of the power perturbation in the power system;

the process performed by the processor further includes:
estimating a first Thevenin's equivalent impedance based on the received data and the estimated first set of system parameters;
estimating a second Thevenin's equivalent impedance based on the received data and the estimated second set of system parameters; and
estimating a final Thevenin's equivalent impedance by averaging the first and second estimated Thevenin's equivalent impedances; and determining the voltage stability index includes determining the voltage stability index based on the estimated final Thevenin's equivalent impedance.

18. The method of claim 12 wherein the load condition is a predicted load condition, and wherein the method further includes:

obtaining predicted load information of the power system under the predicted load condition; and deriving the data representing the set of system parameters of the power system based on the obtained predicted load information.

19. The method of claim 12 wherein:

estimating the one or more additional sets of system parameters includes estimating first and second sets of the system parameters based on the received data, the topology information of the power system, and a power perturbation in the power system;

the process performed by the processor further includes estimating a Thevenin's equivalent impedance based on the received data and the estimated first and second sets of system parameters; and determining the voltage stability index includes determining the voltage stability index based on the estimated Thevenin's equivalent impedance.

* * * * *